(12) United States Patent
Vishwakarma et al.

(10) Patent No.: US 10,677,663 B2
(45) Date of Patent: Jun. 9, 2020

(54) INTELLIGENT TEMPERATURE MONITORING SYSTEM AND METHOD THEREFOR

(71) Applicant: Eaton Corporation, Cleveland, OH (US)

(72) Inventors: Ashok K. Vishwakarma, Maharashtra (IN); Abhijit A. Bodkhe, Maharashtra (IN); Parag More, Kothrud Pune (IN)

(73) Assignee: Eaton Intelligent Power Limited, Dublin (IE)

( * ) Notice: Subject to any disclaimer, the term of this patent is extended or adjusted under 35 U.S.C. 154(b) by 175 days.

(21) Appl. No.: 15/712,722

(22) Filed: Sep. 22, 2017

(65) Prior Publication Data

US 2018/0087977 A1 Mar. 29, 2018

Related U.S. Application Data

(60) Provisional application No. 62/399,676, filed on Sep. 26, 2016.

(51) Int. Cl.
*G01K 13/02* (2006.01)
*G01K 1/08* (2006.01)
(Continued)

(52) U.S. Cl.
CPC .............. *G01K 13/02* (2013.01); *B64D 37/32* (2013.01); *B67D 7/3218* (2013.01);
(Continued)

(58) Field of Classification Search
CPC .......... G01K 13/02; G01K 1/08; G01K 3/005; G01K 2205/00; B64D 37/32; B67D 7/3218; B67D 7/3254
See application file for complete search history.

(56) References Cited

U.S. PATENT DOCUMENTS 6,442,448 B1 * 8/2002 Finley .................... B67D 7/145
700/231
9,668,385 B2 * 5/2017 Manahan ................. H02B 1/28
(Continued)

OTHER PUBLICATIONS

Aritcle, Digital II Pressure Control System, Model 64235, Eaton Aerospace Group, TF100-104E, Dated May 2013 (8 pages).

*Primary Examiner* — Lisa M Caputo
*Assistant Examiner* — Philip L Cotey
(74) *Attorney, Agent, or Firm* — Fishman Stewart PLLC

(57) ABSTRACT

A temperature monitoring system includes an enclosure, an external temperature sensor, and an internal temperature sensor. The enclosure may be explosion-proof, and may include a controller and an internal display disposed within the enclosure. The external temperature sensor may be configured to detect an outside temperature, and the internal temperature sensor may be configured to detect a temperature inside the enclosure. Upon the external temperature sensor and/or the internal temperature sensor detecting a temperature that meets or exceeds a set or specified value or limit, the system may be configured to implement an action or order. In an embodiment of the system, the system may be configured to stop fueling in the event that the external temperature sensor and/or the interior temperature sensor detect a temperature that meets or exceeds a certain temperature.

19 Claims, 22 Drawing Sheets

(51) Int. Cl.
*B67D 7/32* (2010.01)
*B64D 37/32* (2006.01)
*G01K 3/00* (2006.01)

(52) U.S. Cl.
CPC ............. *B67D 7/3254* (2013.01); *G01K 1/08* (2013.01); *G01K 3/005* (2013.01); *G01K 2205/00* (2013.01)

(56) References Cited

U.S. PATENT DOCUMENTS

| | | | |
|---|---|---|---|
| 10,466,152 B2* | 11/2019 | Gillette, II | F01M 11/10 |
| 2004/0098218 A1* | 5/2004 | Ito | G01D 9/005 |
| | | | 702/138 |
| 2004/0234338 A1* | 11/2004 | Monroe | B65D 90/503 |
| | | | 405/54 |
| 2007/0187343 A1* | 8/2007 | Colucci | G06F 1/181 |
| | | | 211/26 |
| 2009/0183729 A1* | 7/2009 | Barkhouse | A47J 36/321 |
| | | | 126/39 BA |
| 2010/0138159 A1* | 6/2010 | Conquergood | E21B 19/165 |
| | | | 702/9 |
| 2012/0161596 A1* | 6/2012 | Manahan | H02B 1/28 |
| | | | 312/236 |
| 2013/0035788 A1* | 2/2013 | Divelbiss | B67D 7/04 |
| | | | 700/244 |
| 2013/0083824 A1* | 4/2013 | Bronczyk | G01K 1/02 |
| | | | 374/163 |
| 2014/0054025 A1* | 2/2014 | DeCarr | G05D 23/00 |
| | | | 165/287 |
| 2014/0263420 A1* | 9/2014 | Lambrix | F17C 7/00 |
| | | | 222/3 |
| 2015/0338315 A1* | 11/2015 | Manahan | G01M 99/008 |
| | | | 702/183 |
| 2016/0084673 A1* | 3/2016 | Mayer | H04Q 9/00 |
| | | | 340/870.38 |
| 2017/0006237 A1* | 1/2017 | Rud | H04N 5/33 |
| 2017/0102308 A1* | 4/2017 | Gillette, II | G01N 11/00 |
| 2017/0184675 A1* | 6/2017 | Freer | G01R 31/3277 |
| 2017/0187180 A1* | 6/2017 | Freer | G01R 31/333 |

* cited by examiner

INTELLIGENT TEMPERATURE MONITORING SYSTEM AND METHOD THEREFOR

CROSS-REFERENCE TO RELATED APPLICATION

This application claims the benefit of U.S. Provisional Patent Application Ser. No. 62/399,676, filed on Sep. 26, 2016, the disclosure of which is hereby incorporated herein by reference in its entirety.

TECHNICAL FIELD

The present disclosure relates generally to temperature monitoring systems and methods, including intelligent monitoring systems that have compact package designs and can combine display and controller functions in an explosion-proof enclosure.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Existing explosion-proof enclosure designs have separate enclosures for controllers and displays. That can involve high cost and intricate wiring harness connections for the system. Additionally, existing designs may not have a temperature monitoring feature to detect the temperature rise inside and outside of the enclosure.

Further, in some instances, the use of controllers and display devices in certain areas or applications may increase a risk of hazards (such as a fire or an explosion) with the presence of an electrical device. Electrical devices used in potentially hazardous areas may need to be certified in accordance with requirements for particular jurisdictions. Further, often the types of protection required can vary depending on the risks and hazards involved.

There is a desire for solutions/options that minimize or eliminate one or more challenges or shortcomings of enclosures. The foregoing discussion is intended only to illustrate examples of the present field and should not be taken as a disavowal of scope.

SUMMARY

In embodiments, a temperature monitoring system may include an enclosure, a controller and an internal display that may be disposed within the enclosure, an external temperature sensor configured to detect an outside temperature, and/or an internal temperature sensor configured to detect an inside temperature inside the enclosure. If the external temperature sensor or the internal temperature sensor detect an outside temperature or an inside temperature that meets or exceeds a set or specified value or limit, the controller may be configured to implement an action or order.

With embodiments, an explosion-proof enclosure may include an enclosure that may include a body and a cover, a display disposed in the enclosure and connected to the cover, a first controller disposed in the enclosure and connected to the display. An explosion-proof enclosure assembly may include a terminal block disposed in the enclosure, a terminator disposed in the enclosure, and/or a first wiring harness connecting the first controller with the terminal block and the terminator. An explosion-proof enclosure assembly may include a second controller disposed in the enclosure, a third controller disposed in the enclosure, a second wiring harness connecting the second controller with the terminal block and the terminator, a third wiring harness connecting the third controller with the terminal block and the terminator, and/or a fourth wiring harness connecting the display to the terminal block and the terminator.

Embodiments of systems disclosed herein may, for example and without limitation, provide intelligent monitoring and compact package design via, among other things, combining or integrating a display and one or more controllers in one explosion-proof enclosure.

The foregoing and other aspects, features, details, utilities, and/or advantages of embodiments of the present disclosure will be apparent from reading the following description, and from reviewing the accompanying drawings.

DETAILED DESCRIPTION

Figure 1A:
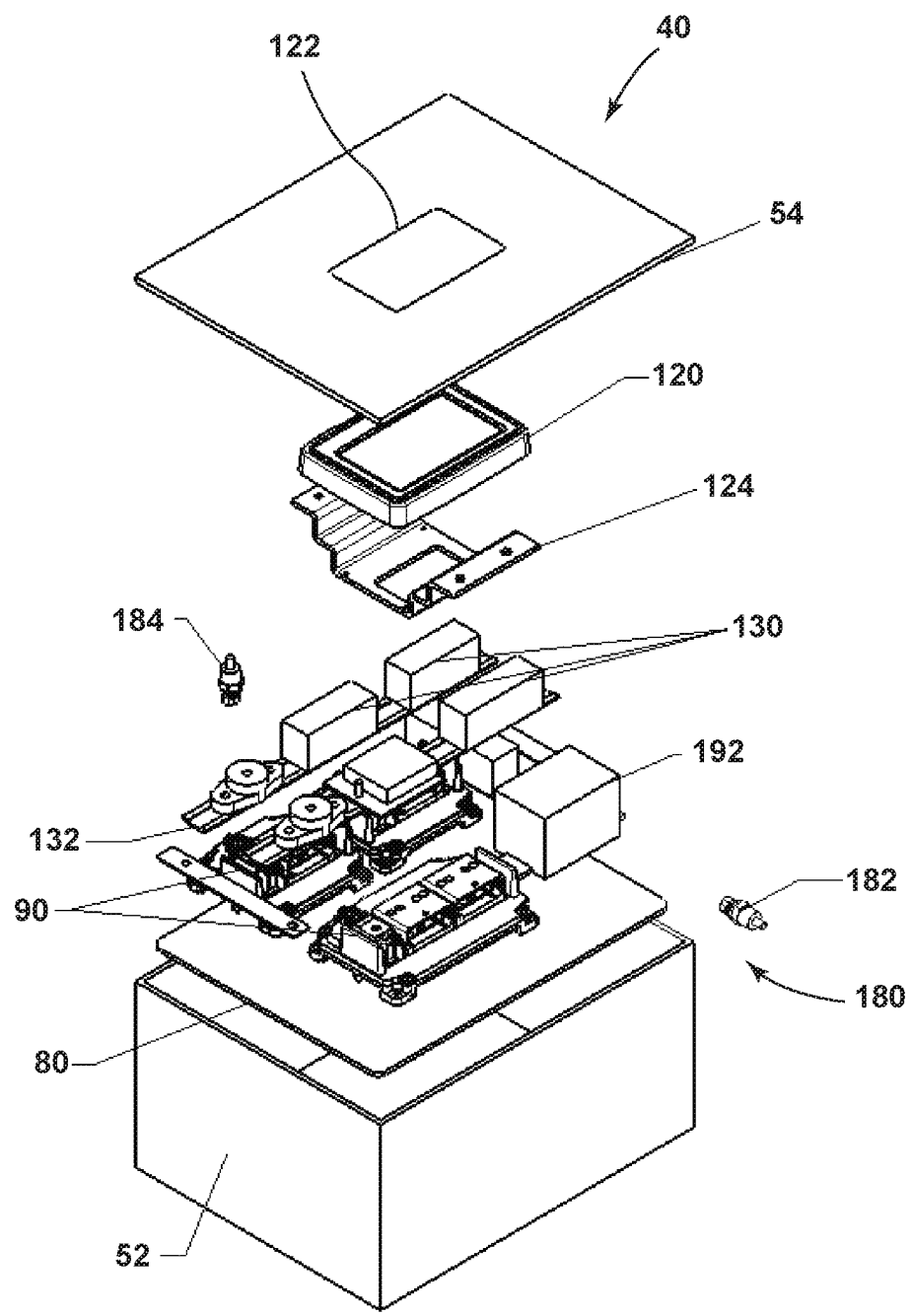
FIGS. 1A and 1B are exploded perspective views generally illustrating embodiments of enclosure assemblies in accordance with teachings of the present disclosure.
Figure 1B:
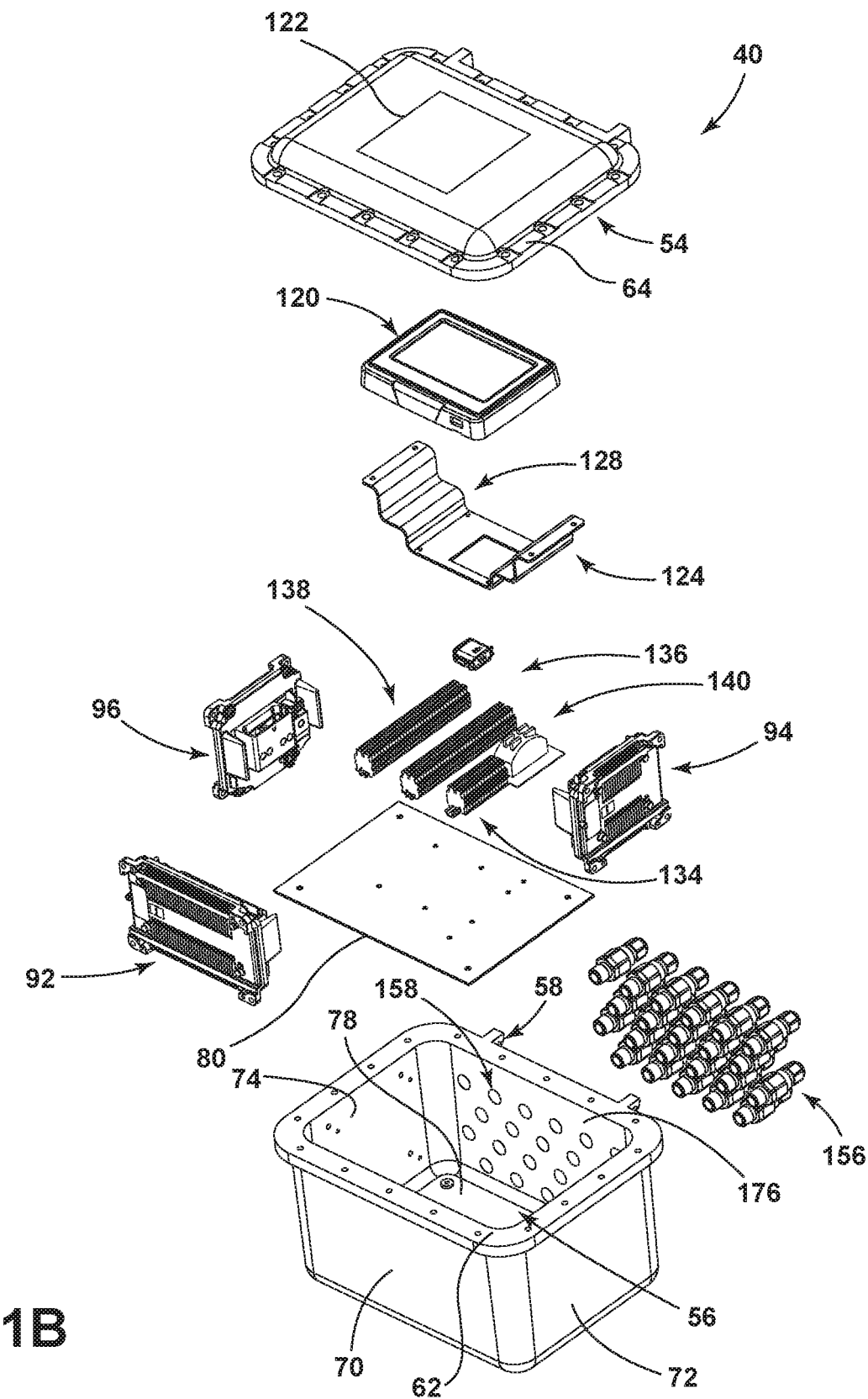
Figure 2:
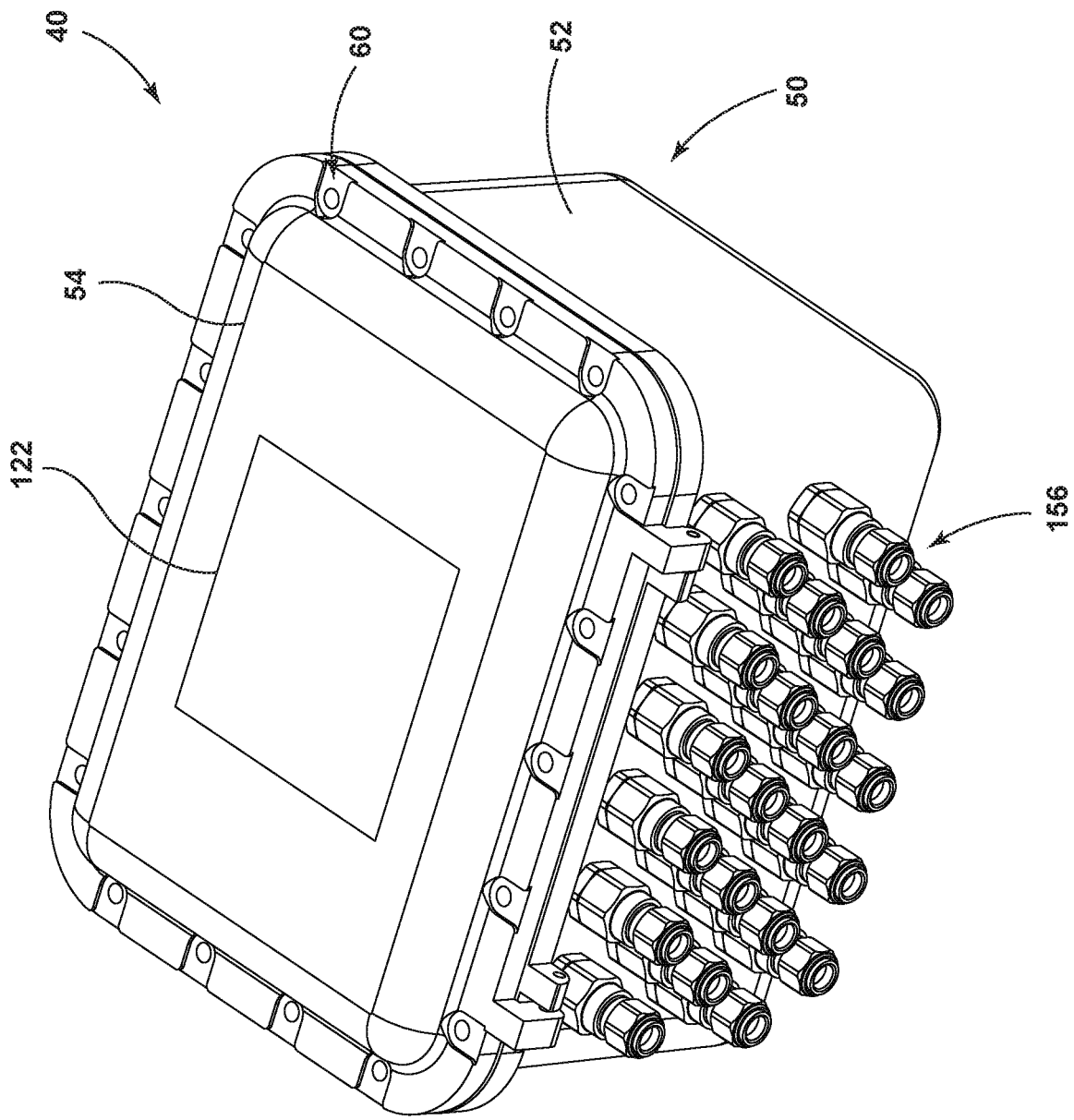
FIGS. 2, 3A, and 3B are perspective views generally illustrating embodiments of enclosure assemblies in accordance with teachings of the present disclosure.

Reference will now be made in detail to embodiments of the present disclosure, examples of which are described herein and illustrated in the accompanying drawings. While the present disclosure will be described in conjunction with embodiments and/or examples, it will be understood that they are not intended to limit the present disclosure to these embodiments and/or examples. On the contrary, the present disclosure is intended to cover alternatives, modifications and equivalents.

Some fluid control systems, such as systems that are not compatible or certified for use in explosive environments, may not have a temperature monitoring system and a display inside a common enclosure. Instead, a display is typically mounted in a separate enclosure. However, including a display in a separate enclosure can, among other things, add cost and weight, along with possibly requiring the inclusion of add-on wiring harnesses.

With embodiments, such as generally illustrated in FIGS. 1A, 1B, 2, 3A, 3B, and 4, a fluid control system 30 may include an enclosure assembly 40 that may include an enclosure 50, one or more controllers 90, a terminal block 130, a fuse 140, and/or one or more wiring harnesses 170. An enclosure assembly 40 may include, may be included with, and/or may be connected to an intelligent temperature monitoring system 180. An enclosure 50 may include a body 52 and/or a cover 54. In embodiments, an enclosure assembly 40 may be utilized in connection with controlling and/or may be included with a fluid system 100, such as an aircraft refueling system, which may involve one or more flammable, hazardous, and/or explosive materials or substances.

With embodiments, a body 52 may be configured for connection with a cover 54 to provide an explosion-proof enclosure 50 that may house one or more components (e.g., controllers, terminal blocks, displays, etc.). As used herein, the term "explosion-proof" may comport with definitions that are commonly known and/or used in relevant industries or fields. For example and without limitation, "explosion-proof" components may or may not comply with one or more ATEX (Appareils destinés à être utilisés en Atmosphères Explosibles) directives. Further, embodiments of an explosion-proof enclosure 50 may be configured to prevent combustion within an internal chamber, such as an internal chamber 56 provided by body 52 and/or cover 54, from escaping into the surrounding environment.

Figure 7:
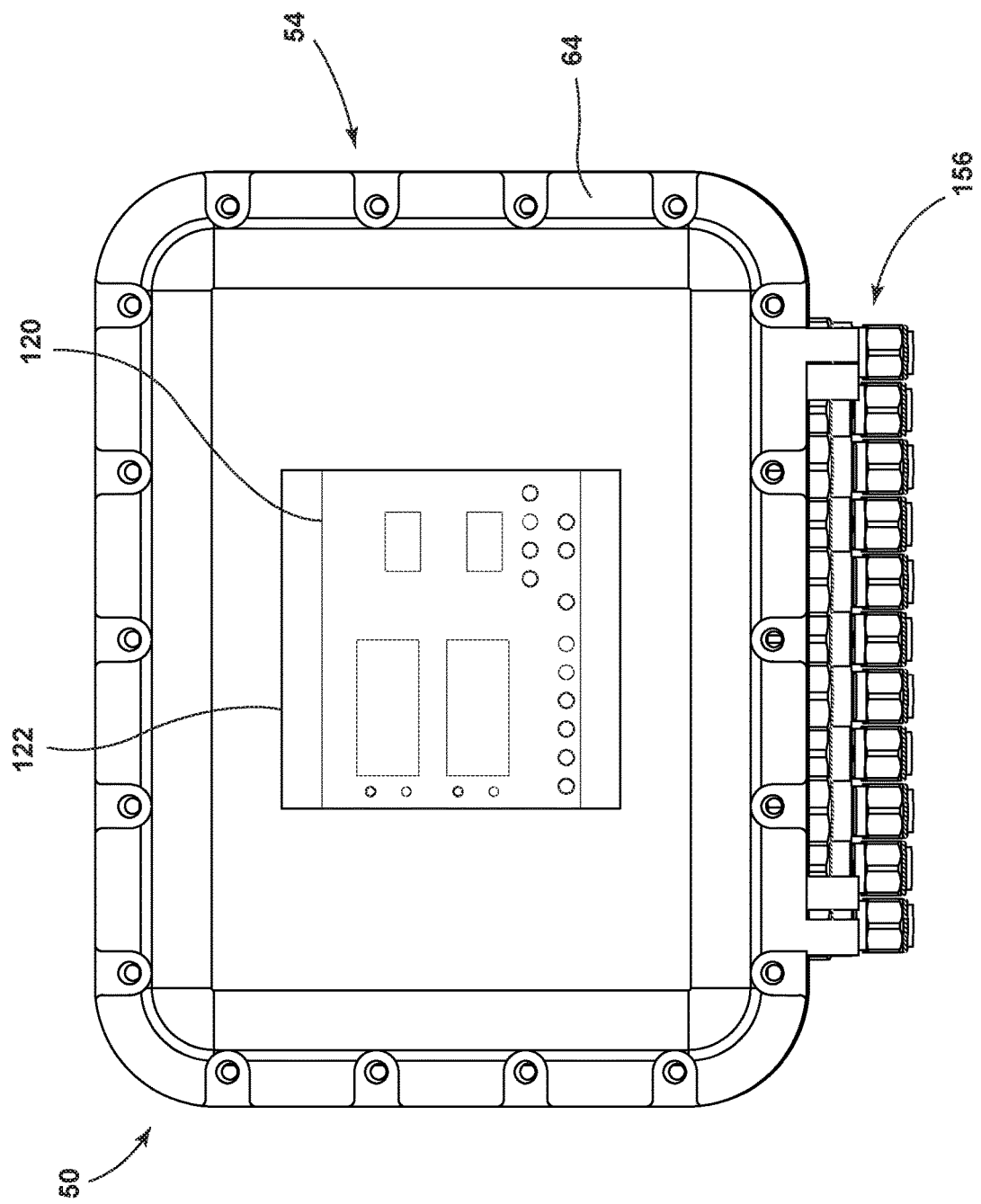
FIG. 7 is a top view generally illustrating embodiments of a cover and a display in accordance with teachings of the present disclosure.

In embodiments, a cover 54 may be rotatably connected with a body 52, such as via a hinge 58. Cover 54 may rotate from an open position (see, e.g., FIGS. 8 and 9) to a tightly closed position (see, e.g., FIGS. 2 and 7) that may provide a fluid seal (e.g., a hermetic seal) for an internal chamber 56 of enclosure assembly 40. For example and without limitation, in a closed position, cover 54 may be connected to enclosure 50 via a plurality of fasteners 60 (e.g., about 18 screws or bolts) that may extend through corresponding flanges 62, 64 of body 52 and cover 54.

With embodiments, a body 52 may include one or more of a variety of shapes, sizes, configurations, and/or materials. For example and without limitation, body 52 may include a generally rectangular configuration, and may include a first wall 70, a second wall 72, a third wall 74, a fourth wall 76, and/or a fifth wall 78. First wall 70, second wall 72, third wall 74, and/or fourth wall 76 may be disposed substantially perpendicularly to fifth wall 78 (e.g., first wall 70, second wall 72, third wall 74, and fourth wall 76 may be substantially vertically and fifth wall 78 may be substantially horizontally). A base or mounting plate 80 may be connected to fifth wall 78. Base or mounting plate 80 may facilitate connection of other components with body 52 and/or fifth wall 78. In a closed position, cover 54 may be disposed substantially in parallel with fifth wall 78. Some or all of walls 70, 72, 74, 76, 78 and/or base or mounting plate 80 may, for example and without limitation, include a metal, such as aluminum and/or cast aluminum.

With embodiments, an enclosure assembly 40 may include one or more controllers 90, such as a first controller 92, a second controller 94, and/or a third controller 96. In embodiments, a first controller 92 may be configured to control and/or communicate with second controller 94, third controller 96, and/or a display 120. A first controller 92 may include, for example, a programmable logic controller (PLC). First controller 92 may serve as a main controller for a fluid control system 30. Some or all connections, such as all connections other than flow meters, pressure transducers, and/or output solenoids, may be connected (e.g., directly) to first controller 92. First controller 92 may include a plurality of input/output (TO) ports and may broadcast CAN (controller area network) messages that may include a status of one or more IO ports. First controller 92 may communicate with other remotely mounted controllers and/or displays.

In embodiments, a second controller 94 (e.g., a primary pressure control module or PPCM controller) and/or a third controller 96 (e.g., a secondary pressure control module or SPCM controller) may be configured to control fluid of a fluid system 100. For example and without limitation, second controller 94 and/or third controller 96 may be configured to control a fluid pressure at a nozzle 102 connected to or configured for connection with an aircraft 104 (see, e.g., FIG. 4). Second controller 94 and/or third controller 96 may serve as a dedicated control node that may be disposed or mounted near a pressure control valve 106 of a fluid system 100. Second controller 94 and/or third controller 96 may be connected to one or more solenoids 108 that may control a pressure control valve 106. Second controller 94 and/or third controller 96 may be connected to a pressure transducer 110, which may be connected to a vehicle (e.g., a fuel truck or cart). Second controller 94 and/or third controller 96 may be connected to a flow meter 112 (e.g., a flow meter pulser). Second controller 94 and/or third controller 96 may be configured to control pressure control valve 106 according to outputs from pressure transducer 110 and/or flow meter 112.

With embodiments, one or more of first controller 92, second controller 94, and third controller 96 may be connected (e.g., mounted) to a wall of body 52 (e.g., walls, 70, 72, 74, 76, 78). For example and without limitation, first controller 92 may be mounted to first wall 70, second controller 94 may be mounted to second wall 72, and/or third controller 96 may be mounted to third wall 74.

With embodiments, such as generally illustrated in FIGS. 5, 6, 7, 8, and 9, an enclosure assembly 40 may include a display 120. One or more of first controller 92, second controller 94, and third controller 96 may be configured to control display 120 and/or display 120 may include an integrated controller. Display 120 may, for example, be connected to cover 54. In embodiments, cover 54 may include a window 122 that may be at least semi-transparent. Display 120 may be connected to cover 54 such that display 120 is at least partially aligned with window 122 and display 120 can be seen from an outside of enclosure assembly 40 through window 122. Window 122 may be explosion-proof and/or may include plate glass.

With the instant disclosure, such as generally illustrated in FIGS. 5, 7, 8, and 9, an innovative way of connecting or mounting a display 120 and controllers 92, 94, 96 may comprise an explosion-proof enclosure 50 that may include an enclosure body 52 and a cover 54. Such unique packaging designs in accordance with teachings of the present disclosure may eliminate external wiring for a display 120 and may provide other benefits.

In embodiments, a display 120 may be connected or mounted to cover 54 via a bracket 124. Bracket 124 may be customized to support display 120 and/or may be connected to cover 54 via one or more fasteners 126, such as standard screws. Bracket 124 may be configured to support display 120 such that display 120 is at least partially aligned with a window 122 of cover 54 and/or such that display 120 may be visible through cover 54, even if cover 54 is in a closed position. For example and without limitation, bracket 124 may include a formation or structural element/feature 128 that may be configured to securely support a perimeter of a display 120, such as during vibration.

In embodiments, such as generally illustrated in FIGS. 1A, 1B, 3A, 3B, 8-13, 15, 17, and 19, an enclosure assembly 40 may include a terminal block 130. A terminal block 130 may be connected to fifth wall 78, such as via one or more DIN rails 132 that may be connected to a base or mounting plate 80. A DIN rail 132 may facilitate wire harness routing inside enclosure assembly 40. DIN rails 132 may provide more free space between components, which can help facilitate assembly and minimize serviceability issues.

With embodiments, a terminal block 130 may include one or more sections, such as a first section 134, a second section 136, and/or a third section 138. First section 134, second section 136, and/or third section 138 may or may not be separate or independent from each other. For example and without limitation, first section 134, second section 136, and/or third section 138 may be disposed in parallel with each other. First section 134 may be configured for connection with a first wire or group of wires 150 (e.g., one or more wires, cables, conductors, etc.) that may be connected to and/or inserted into body 52. Second section 136 may be configured for connection with a second wire or group of wires 152 that may be connected to and/or inserted into body 52. Third section 138 may be configured for connection with a third wire or group of wires 154 that may be connected to and/or inserted into body 52. First section 134 may be connected to a power supply and/or an electrical ground. First section 134 may be connected to a fuse or fuses 140 that may limit an electrical current provided to first controller 92, second controller 94, third controller 96, and/or display 120. With embodiments, fuse or fuses 140 may be connected to fifth wall 78 via a base or mounting plate 80 and/or a DIN rail 132. In embodiments, wires or groups of wires 150, 152, 154 may be connected to and/or inserted at least partially into enclosure assembly 40 via one or more cable glands 156 that may be ATEX-compatible. For example and without limitation, fourth wall 76 may include a plurality of apertures 158 and cable glands 156 may be connected to and/or inserted at least partially into apertures 158. Wires or groups of wires 150, 152, 154 may extend through respective apertures 158. In embodiments, fourth wall 76 may or may not be the only wall through which wires or cables may extend.

Figure 8:
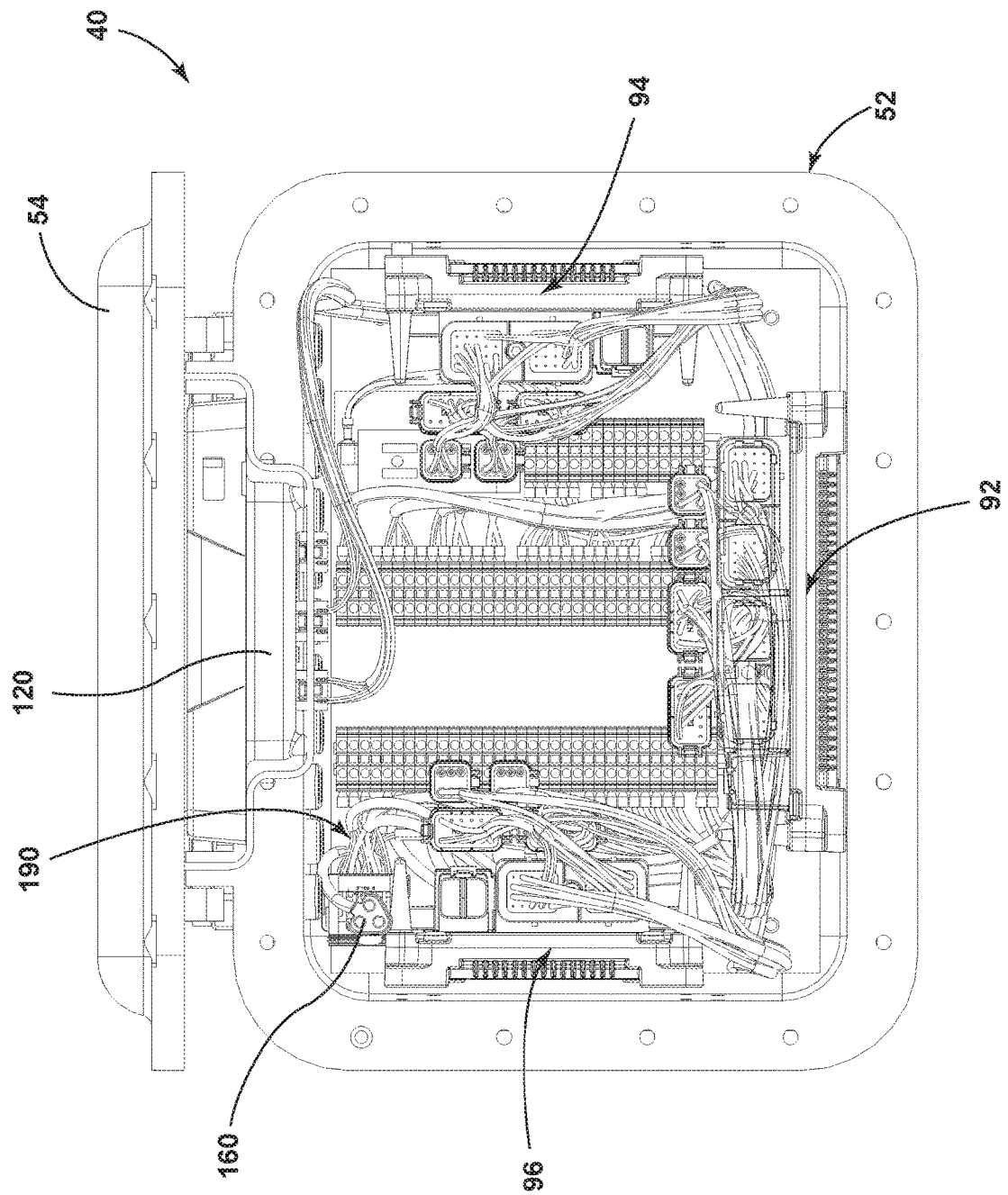
FIG. 8 is a top view generally illustrating an embodiment of an enclosure assembly, with a cover in an open position, in accordance with teachings of the present disclosure.
Figure 9:
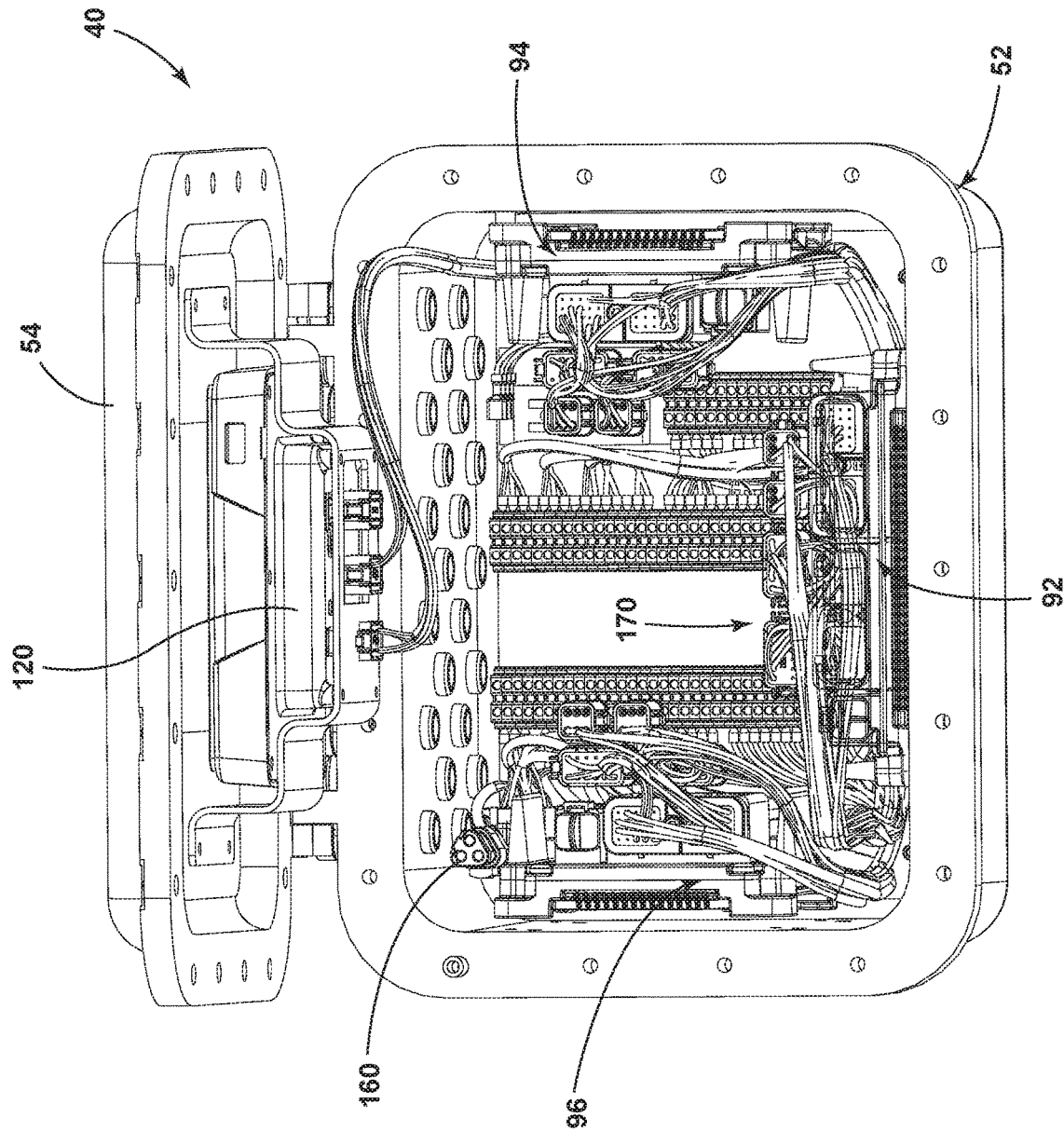
FIG. 9 is a perspective view generally illustrating an embodiment of an enclosure assembly, with a cover in an open position, in accordance with teachings of the present disclosure.
Figure 10:
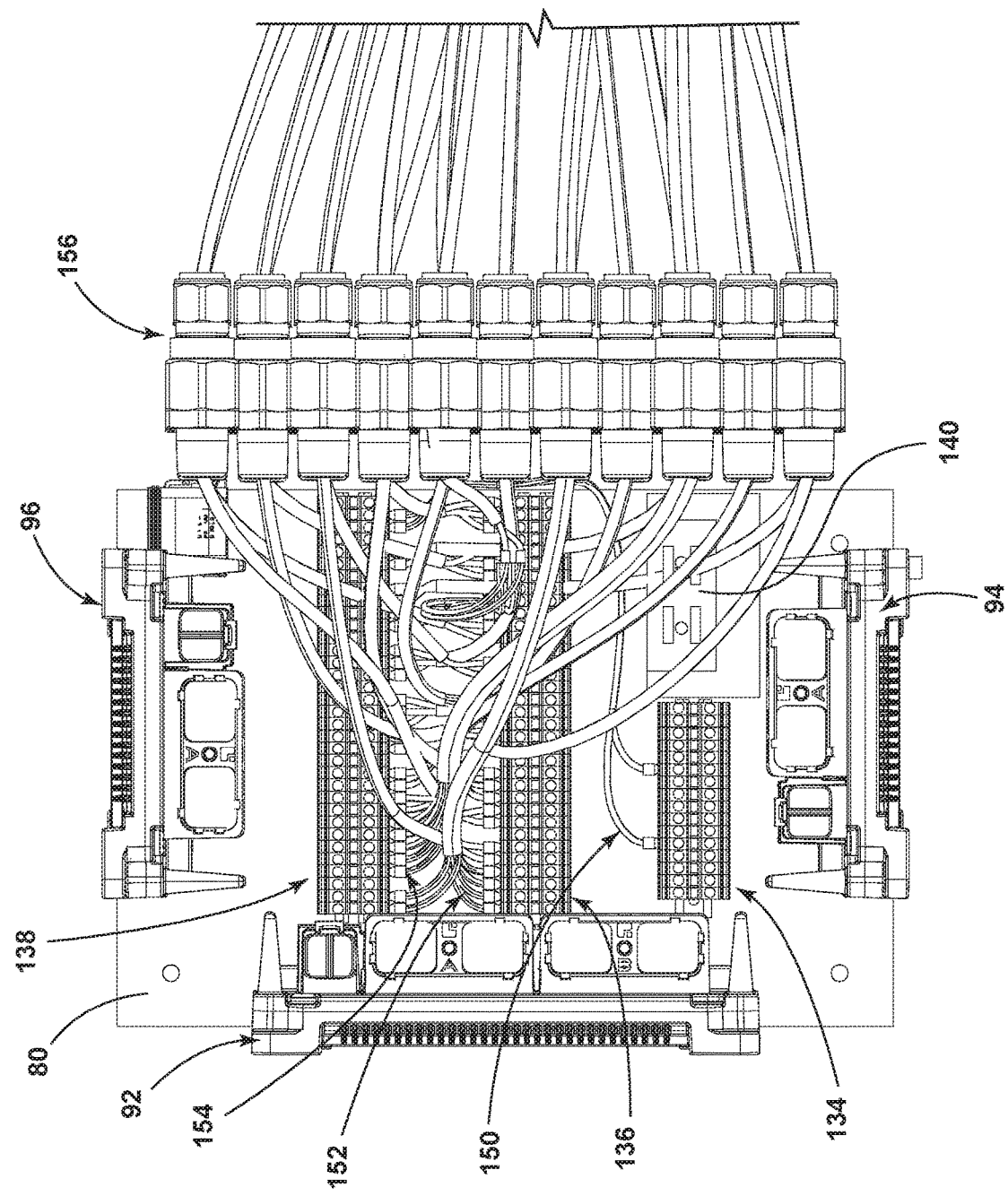
FIG. 10 is a top view generally illustrating an embodiment of an enclosure assembly, with a body and a cover hidden, in accordance with teachings of the present disclosure.
Figure 11:
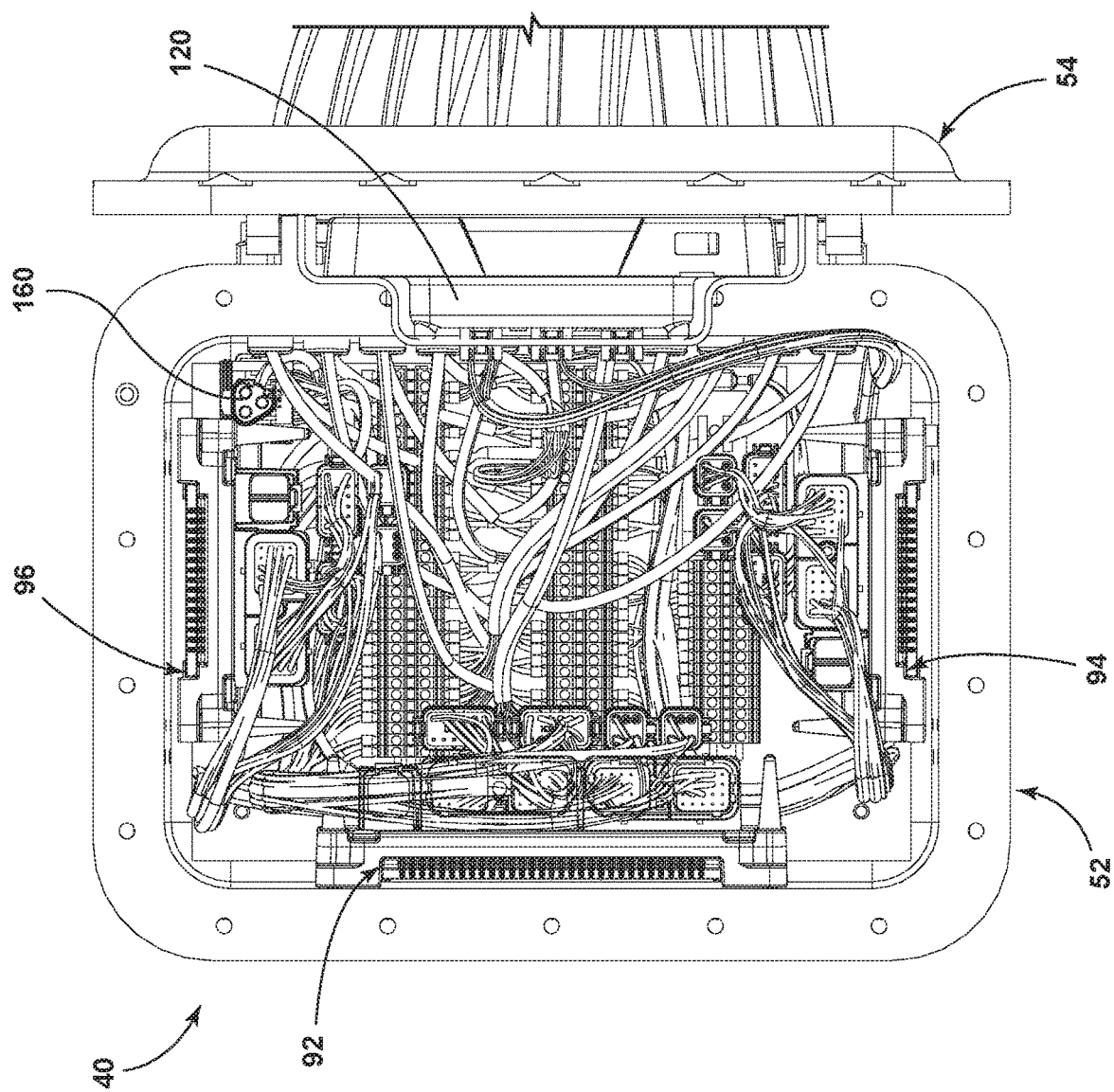
FIG. 11 is a top view generally illustrating an embodiment of an enclosure assembly, with a cover in an open position, in accordance with teachings of the present disclosure.
Figure 12:
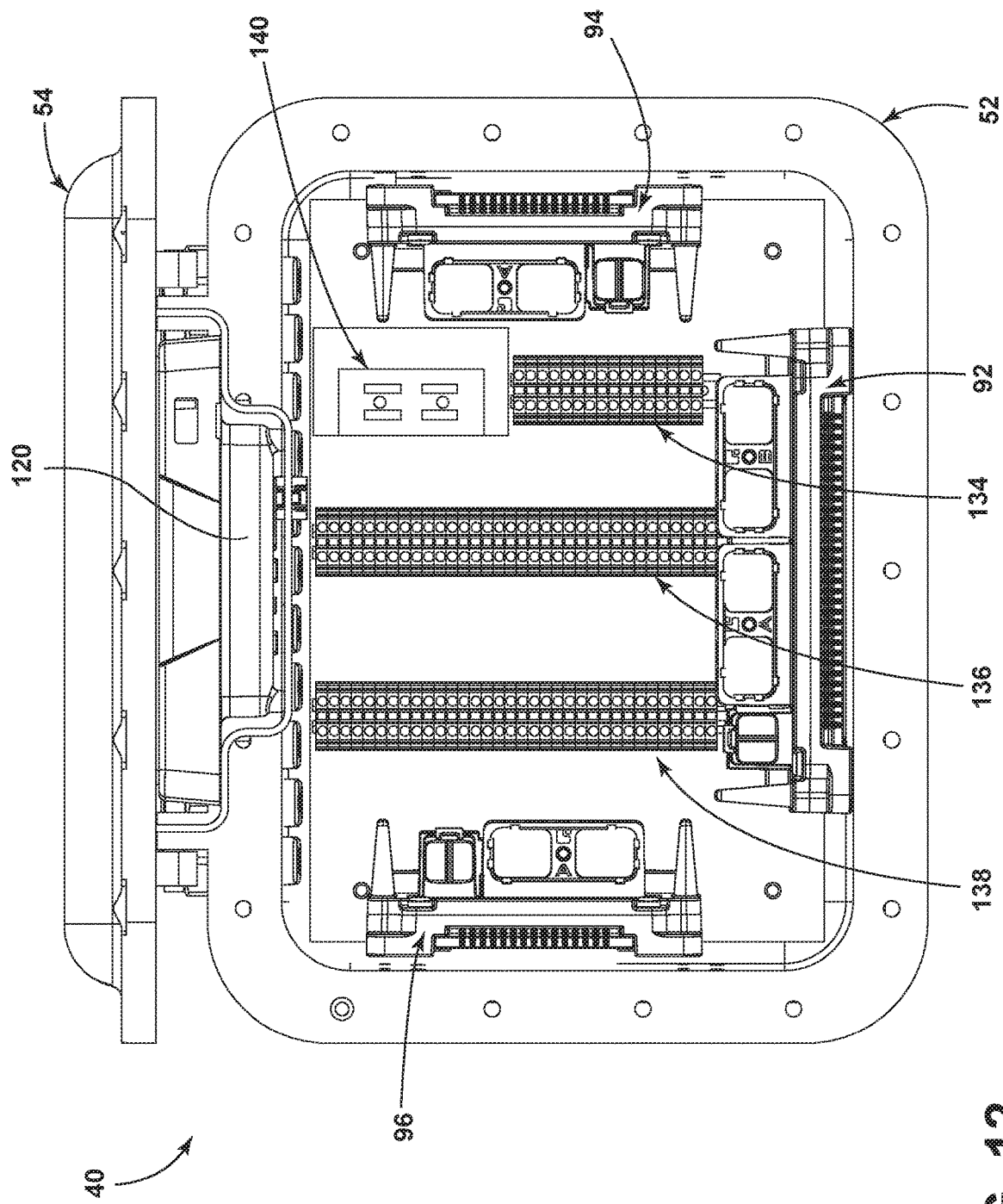
FIG. 12 is a top view generally illustrating an embodiment of an enclosure assembly, with a cover in an open position, in accordance with teachings of the present disclosure.
Figure 13:
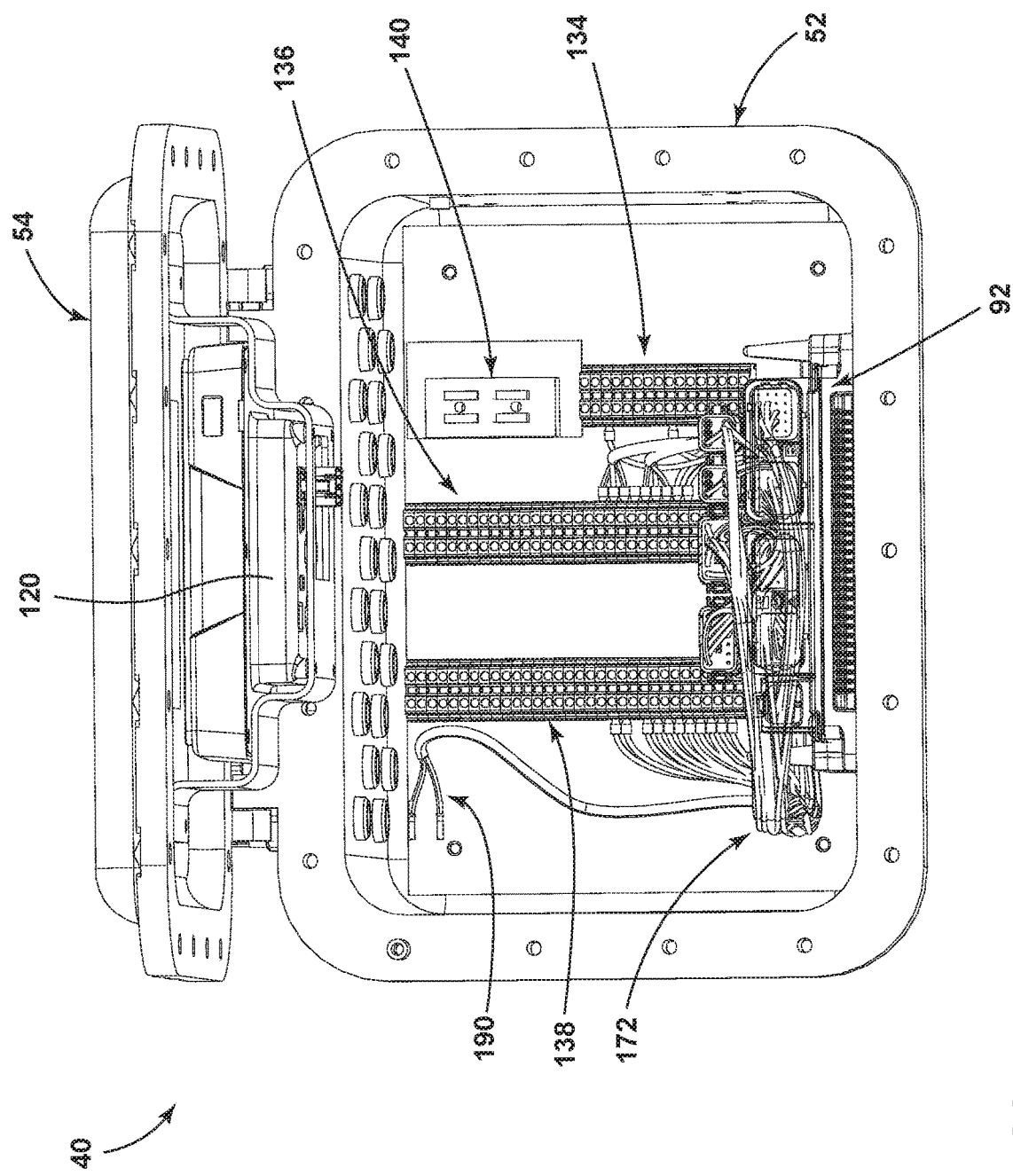
FIG. 13 is a top view generally illustrating an embodiment of an enclosure assembly, including a first controller and a first wiring harness and with a cover in an open position, in accordance with teachings of the present disclosure.
Figure 14:
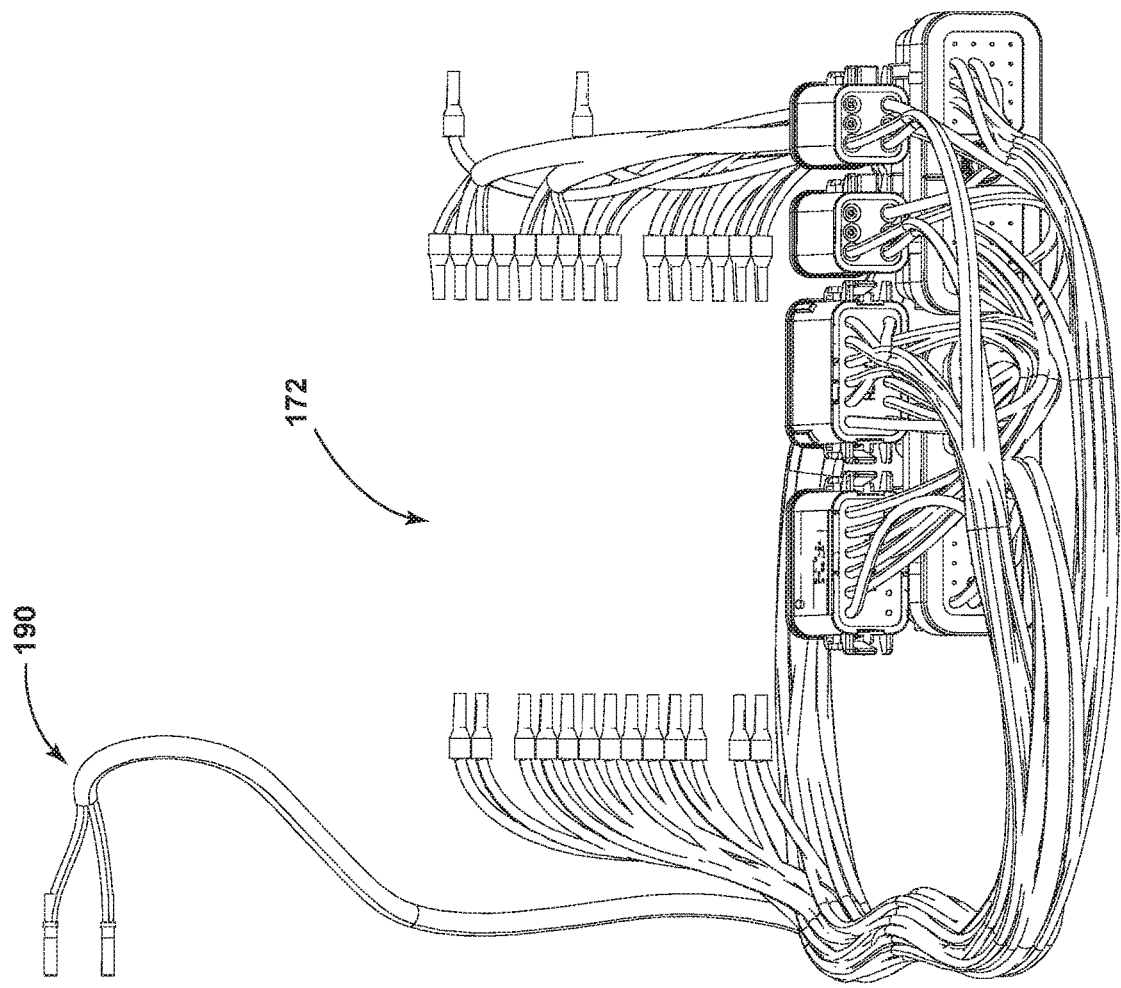
FIG. 14 is a top view generally illustrating an embodiment of a first wiring harness in accordance with teachings of the present disclosure.
Figure 15:
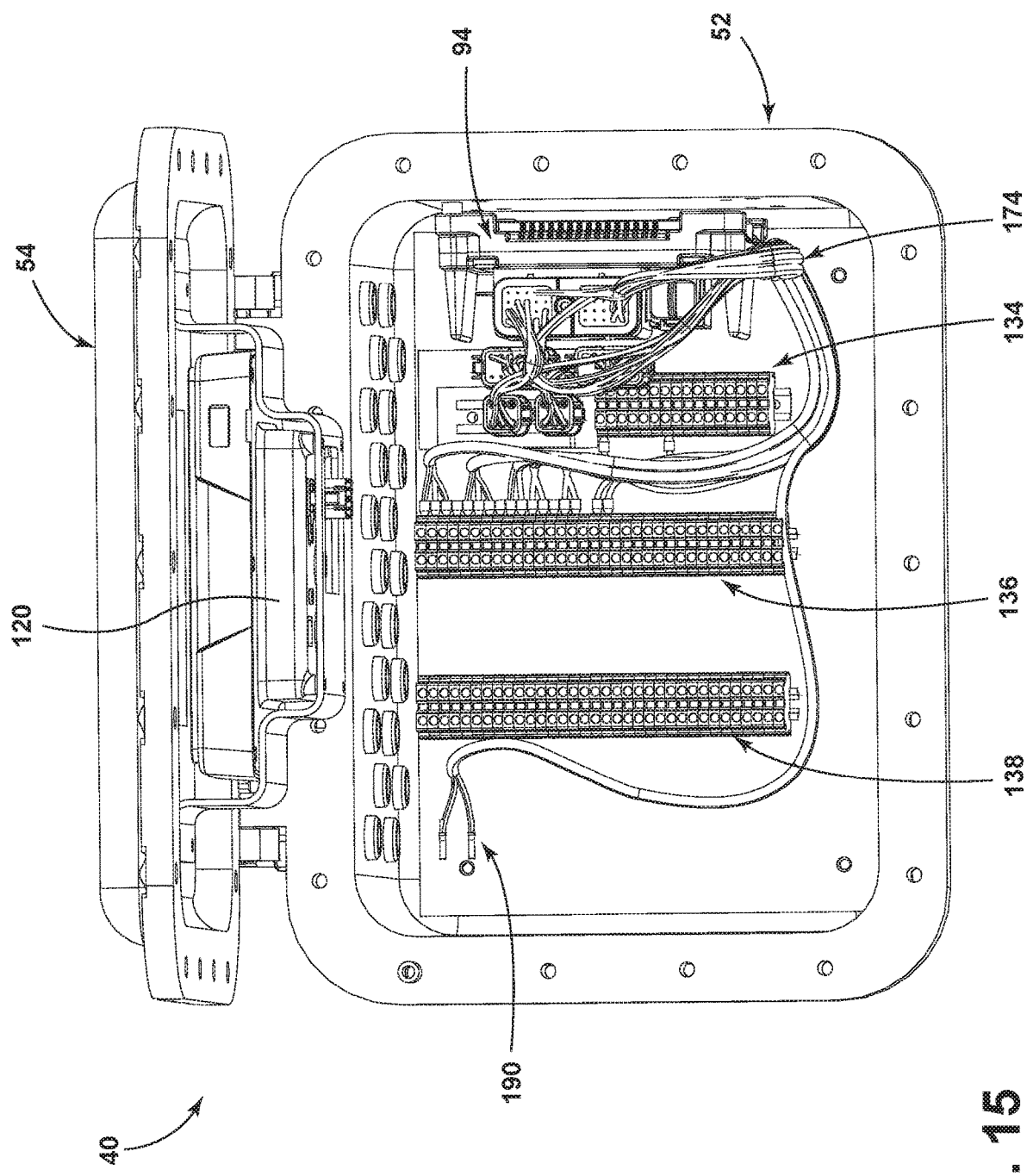
FIG. 15 is a top view generally illustrating an embodiment of an enclosure assembly, including a second controller and a second wiring harness and with a cover in an open position, in accordance with teachings of the present disclosure.
Figure 16:
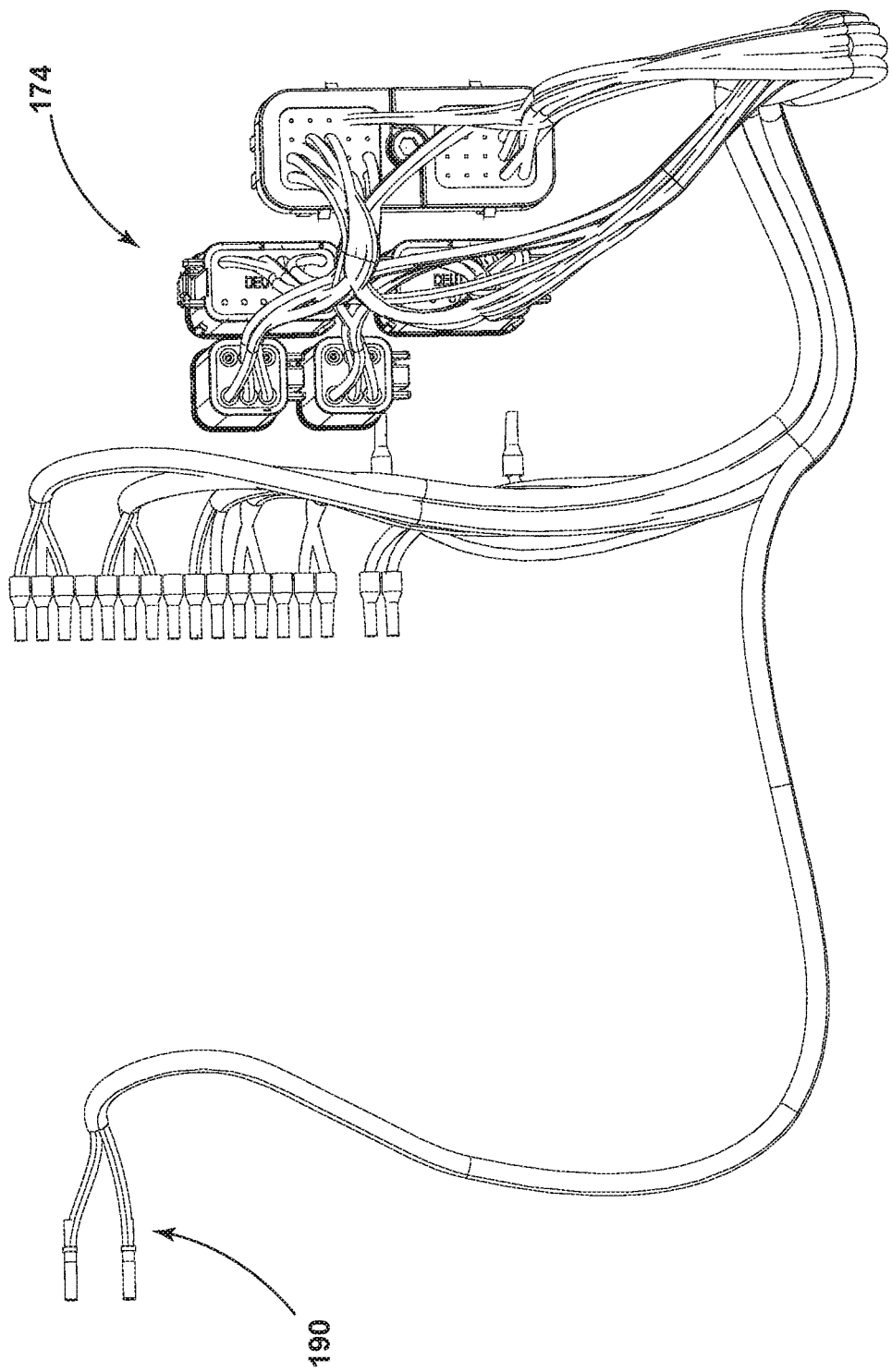
FIG. 16 is a top view generally illustrating an embodiment of a second wiring harness in accordance with teachings of the present disclosure
Figure 17:
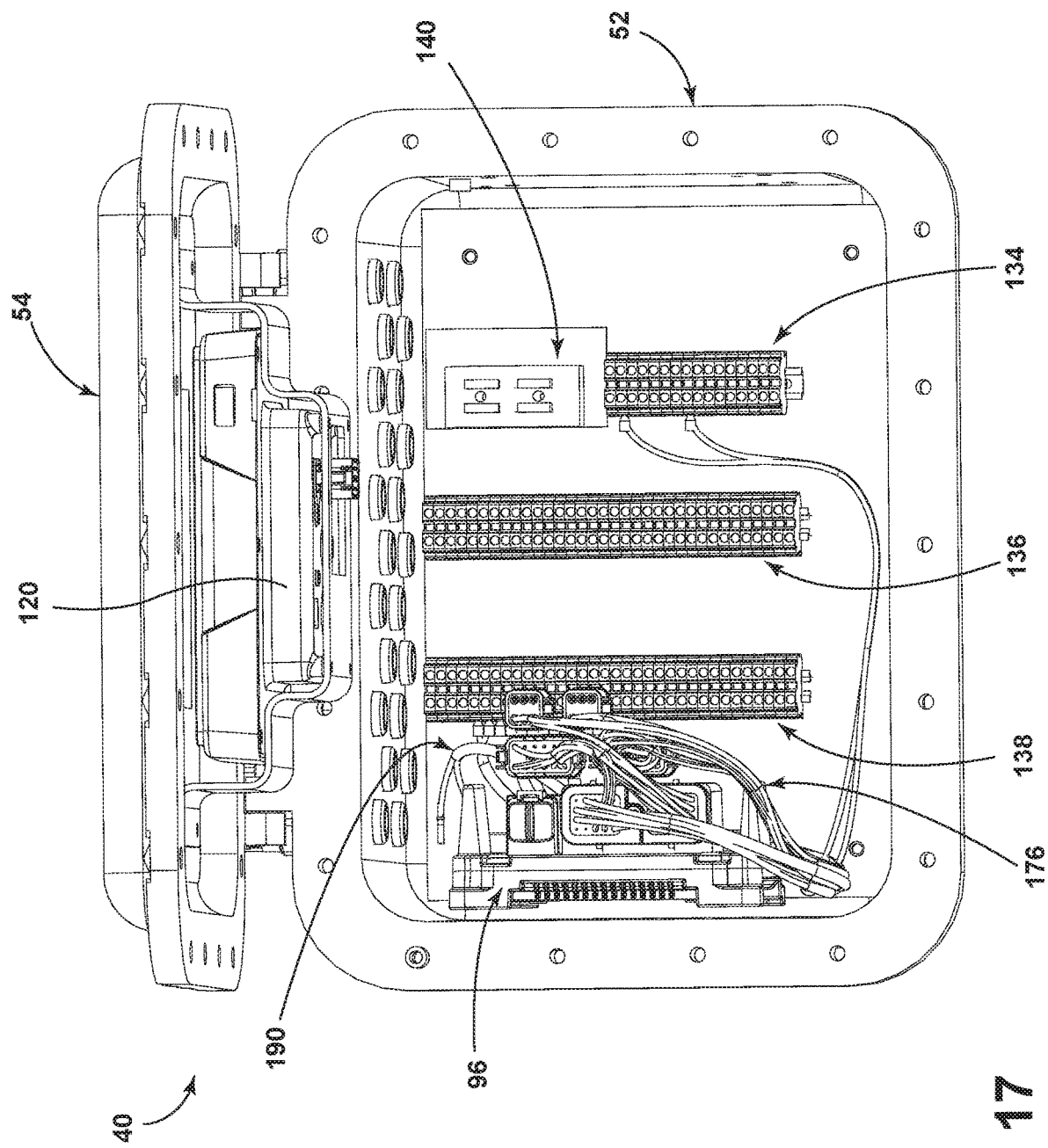
FIG. 17 is a top view generally illustrating an embodiment of an enclosure assembly, including a third controller and a third wiring harness and with a cover in an open position, in accordance with teachings of the present disclosure.
Figure 18:
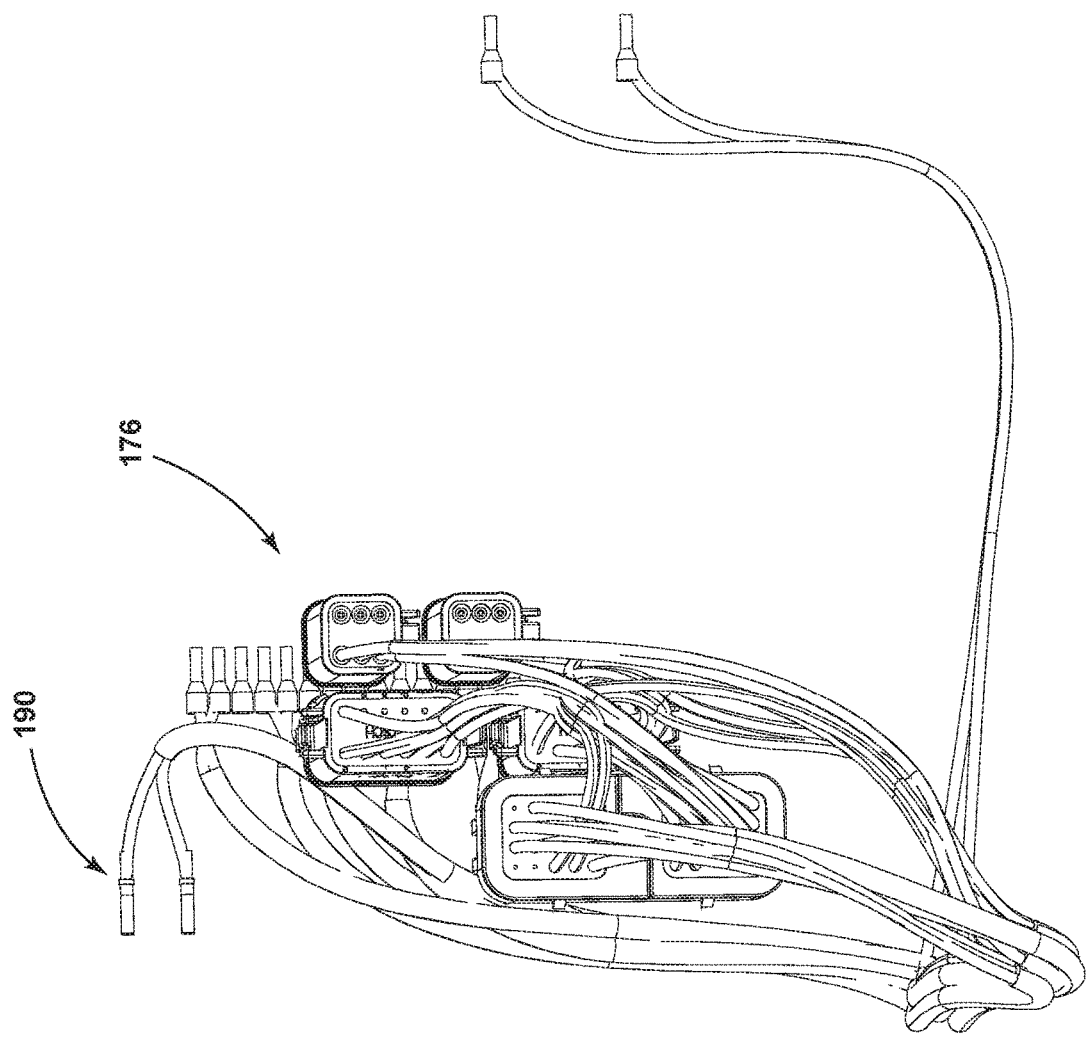
FIG. 18 is a top view generally illustrating an embodiment of a third wiring harness in accordance with teachings of the present disclosure.
Figure 19:
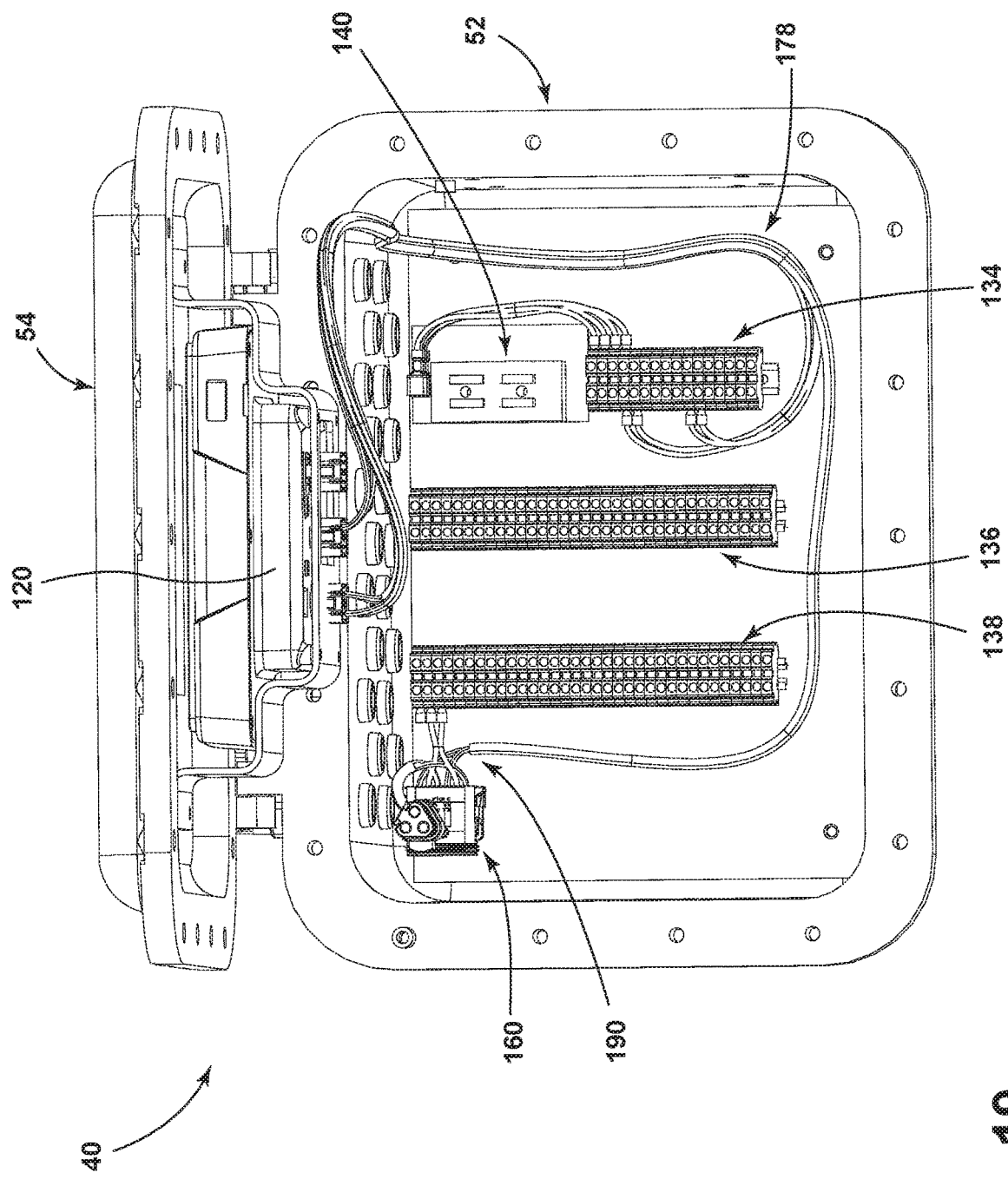
FIG. 19 is a top view generally illustrating an embodiment of an enclosure assembly, including a display and a fourth wiring harness and with a cover in an open position, in accordance with teachings of the present disclosure.
Figure 20:
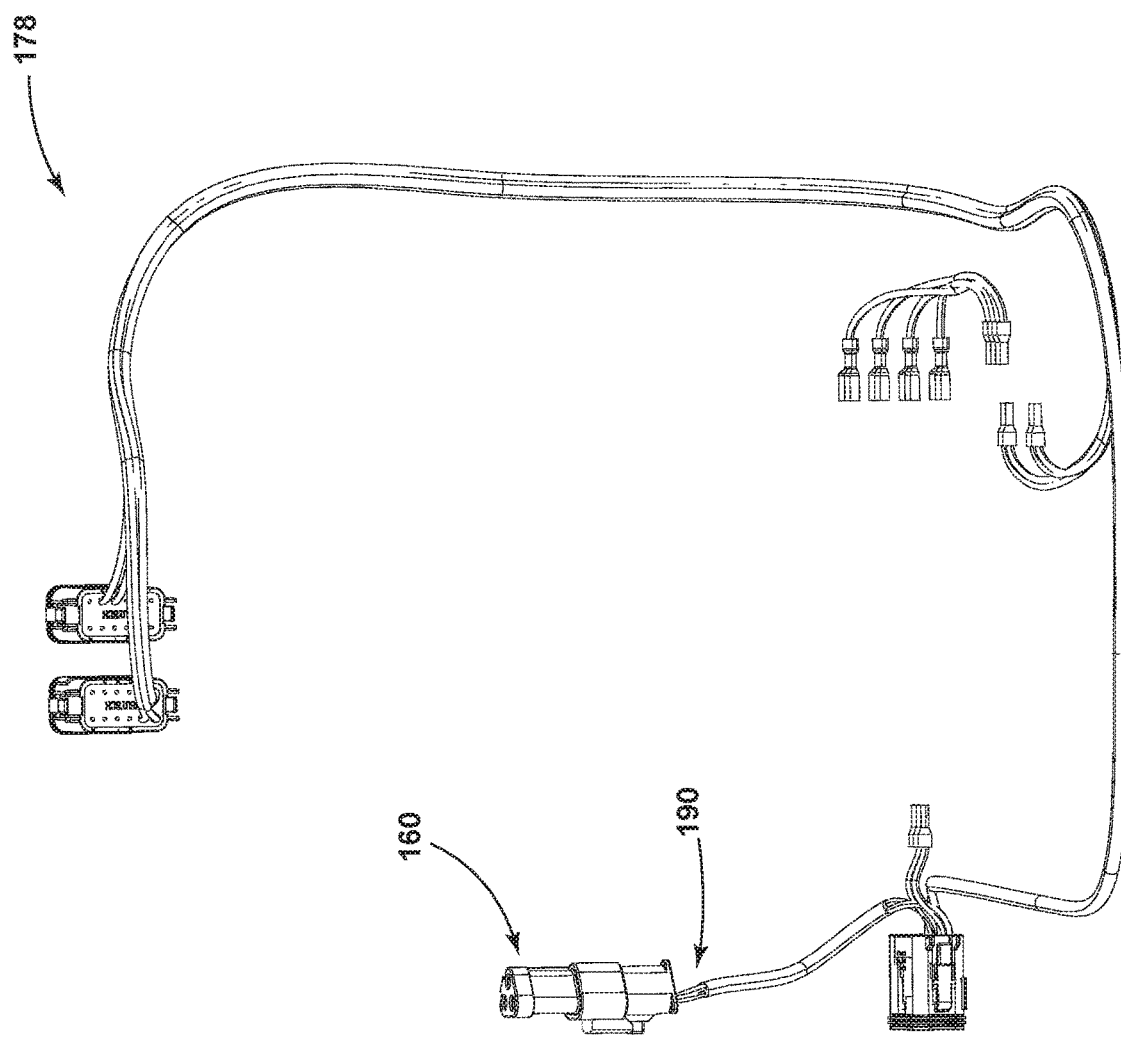
FIG. 20 is a top view generally illustrating an embodiment of a fourth wiring harness in accordance with teachings of the present disclosure.

With embodiments, such as generally illustrated in FIGS. 8, 9, and 11, an enclosure assembly 40 may include one or more terminators 160. A terminator 160 may be connected to fifth wall 78, such as via mounting plate 80 and/or a DIN rail 132. A terminator 160 may be configured for connection with one or more wires, such as one or more controller area network (CAN) wires 190.

With embodiments, an enclosure assembly 40 may include one or more wiring harnesses 170, such as a first wiring harness 172, a second wiring harness 174, a third wiring harness 176, and/or a fourth wiring harness 178. In embodiments, such as generally illustrated in FIGS. 8, 9, 11, 13, and 14, a first wiring harness 172 may connect first controller 92 with first section 134 of terminal block 130, second section 136 of terminal block 130, third section 138 of terminal block 130, and/or terminator 160. With embodiments, such as generally illustrated in FIGS. 8, 9, 11, 15, and 16, a second wiring harness 174 may connect second controller 94 with second section 136 of terminal block 130 and/or terminator 160. In embodiments, such as generally illustrated in FIGS. 8, 9, 11, 17, and 18, a third wiring harness 176 may connect third controller 96 with third section 138 of terminal block 130 and/or terminator 160. With embodiments, such as generally illustrated in FIGS. 8, 9, 11, 19, and 20, a fourth wiring harness 178 may connect display 120 with first section 134 of terminal block 130 and/or terminator 160. First wiring harness 172, second wiring harness 174, third wiring harness 176, and/or fourth wiring harness 178 may include one or more CAN wires 190.

Referring again to FIGS. 1A, 1B, 3A, and 3B, embodiments of enclosure assemblies 40 in accordance with one or more aspects and teachings of the present disclosure may include one or more safety features. For example, an enclosure assembly 40 may include, be included with, and/or be connected to an intelligent temperature monitoring system 180. In embodiments, an intelligent temperature monitoring system 180 may be configured to detect a change (e.g., a rise) in temperature that meets or exceeds a set or specified (e.g., maximum) limit. A temperature may be sensed inside and/or outside of an enclosure 50. If desired, system 180 may be configured to initiate/cease certain actions. For example and without limitation, a temperature monitoring system 180 may be configured to prevent or cease a refueling process in the event of, or following the detection of, a hazardous situation. Ceasing a refueling process may, for example and without limitation, include first controller 92 causing second controller 94 and/or third controller 96 to close a fluid control valve 106. Moreover, such a feature can provide an added advantage by potentially raising the level or standards associated with safety and may encourage higher or more protective class certifications.

In embodiments, a temperature monitoring system 180 may include an external temperature sensor (e.g., sensor 182) that may detect an outside temperature. Such an external temperature sensor 182 may, among other things, detect outside temperatures, for example, to help identify, address, or prevent hazardous conditions such as during an explosive/hazardous condition. External temperature sensor 182 may, for example, be connected to second wall 72 and/or may extend through second wall 72.

With embodiments, a temperature monitoring system 180 may include an internal temperature sensor (e.g., sensor 184) that may detect an inside temperature. Such an internal temperature sensor 184 may, among other things, detect inside temperatures, for example, to help identify, address, or prevent hazardous conditions. Internal temperature sensor 184 may, for example, be connected to base or mounting plate 80, such as at or about an area generally between first controller 92 and second controller 94.

Figure 3A:
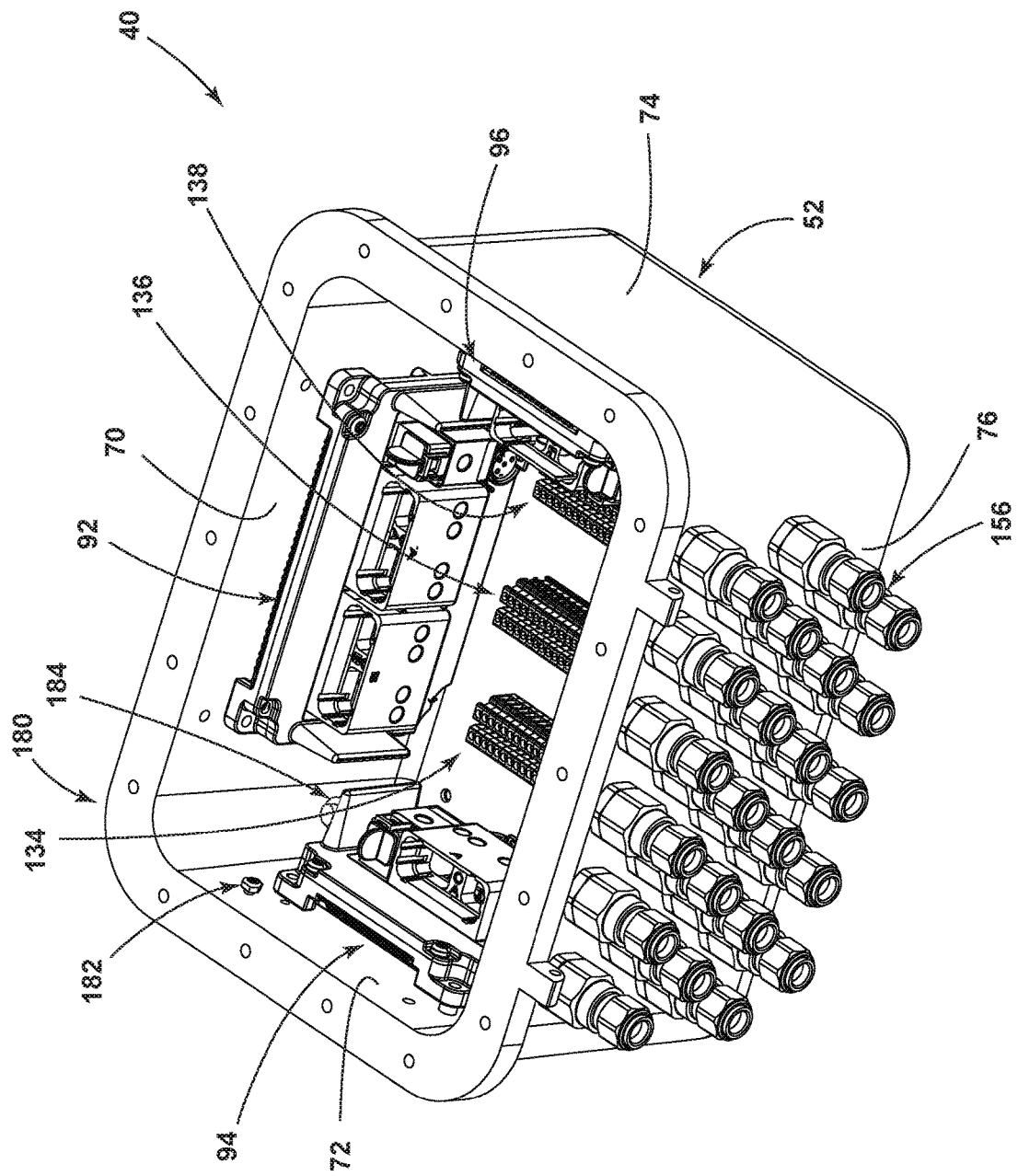
Figure 3B:
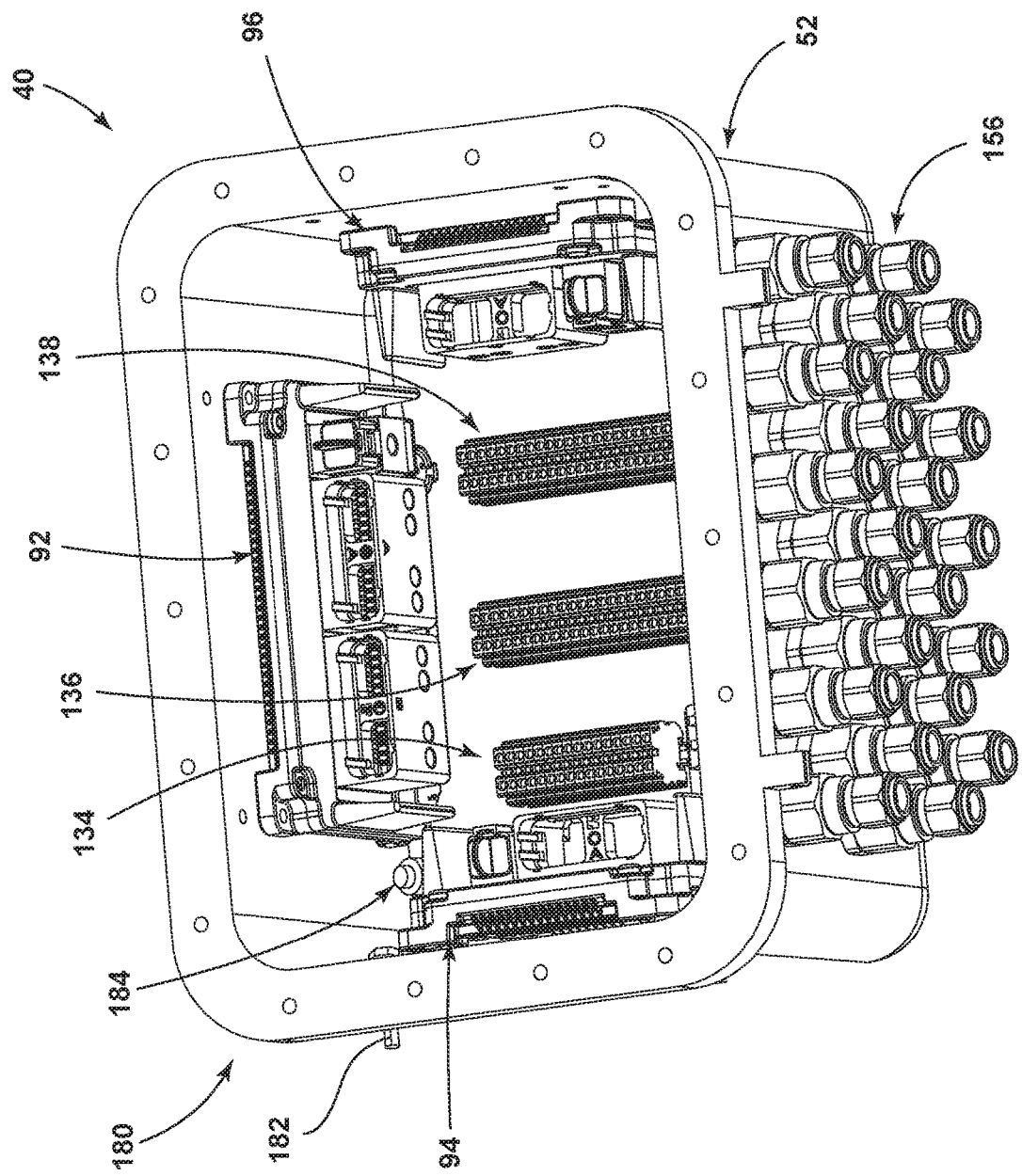
Figure 4:
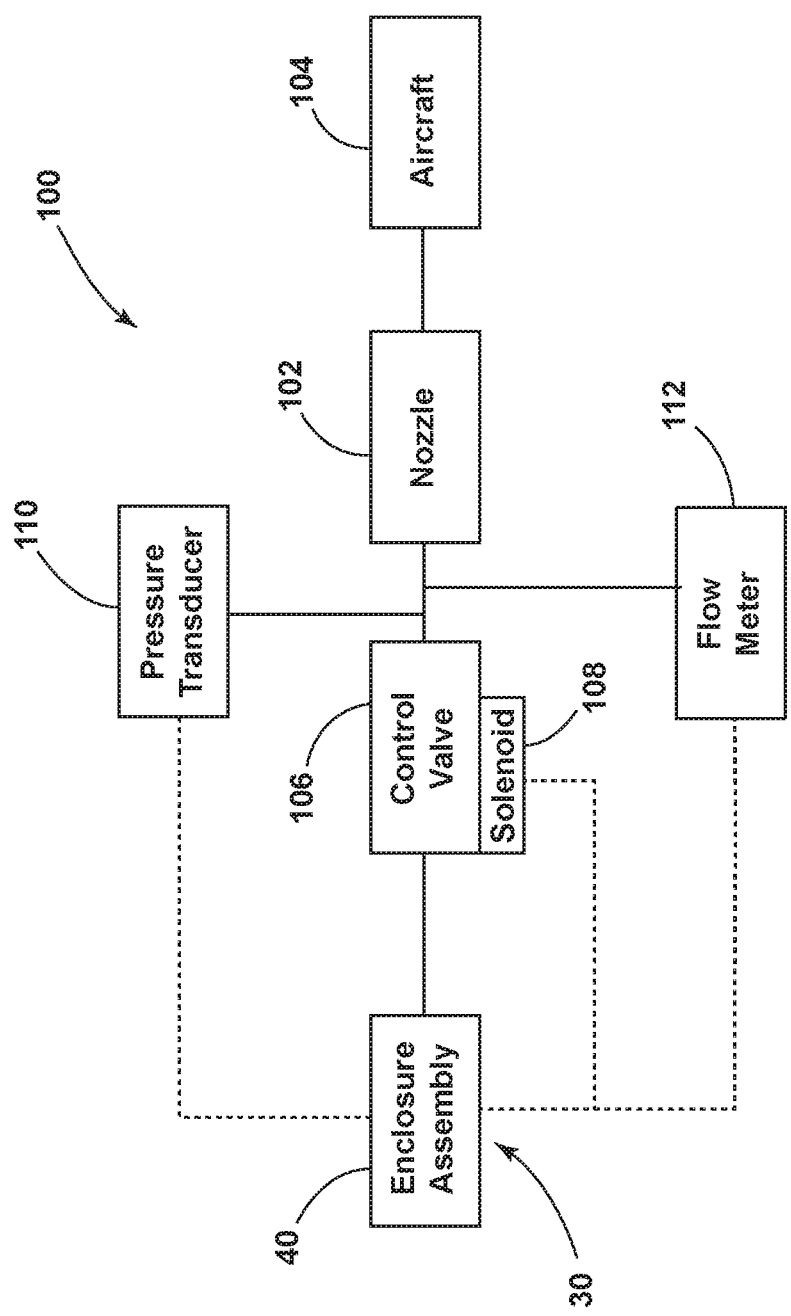
FIG. 4 is a schematic view generally illustrating embodiments of an enclosure assembly and a fluid system in accordance with teachings of the present disclosure.
Figure 5:
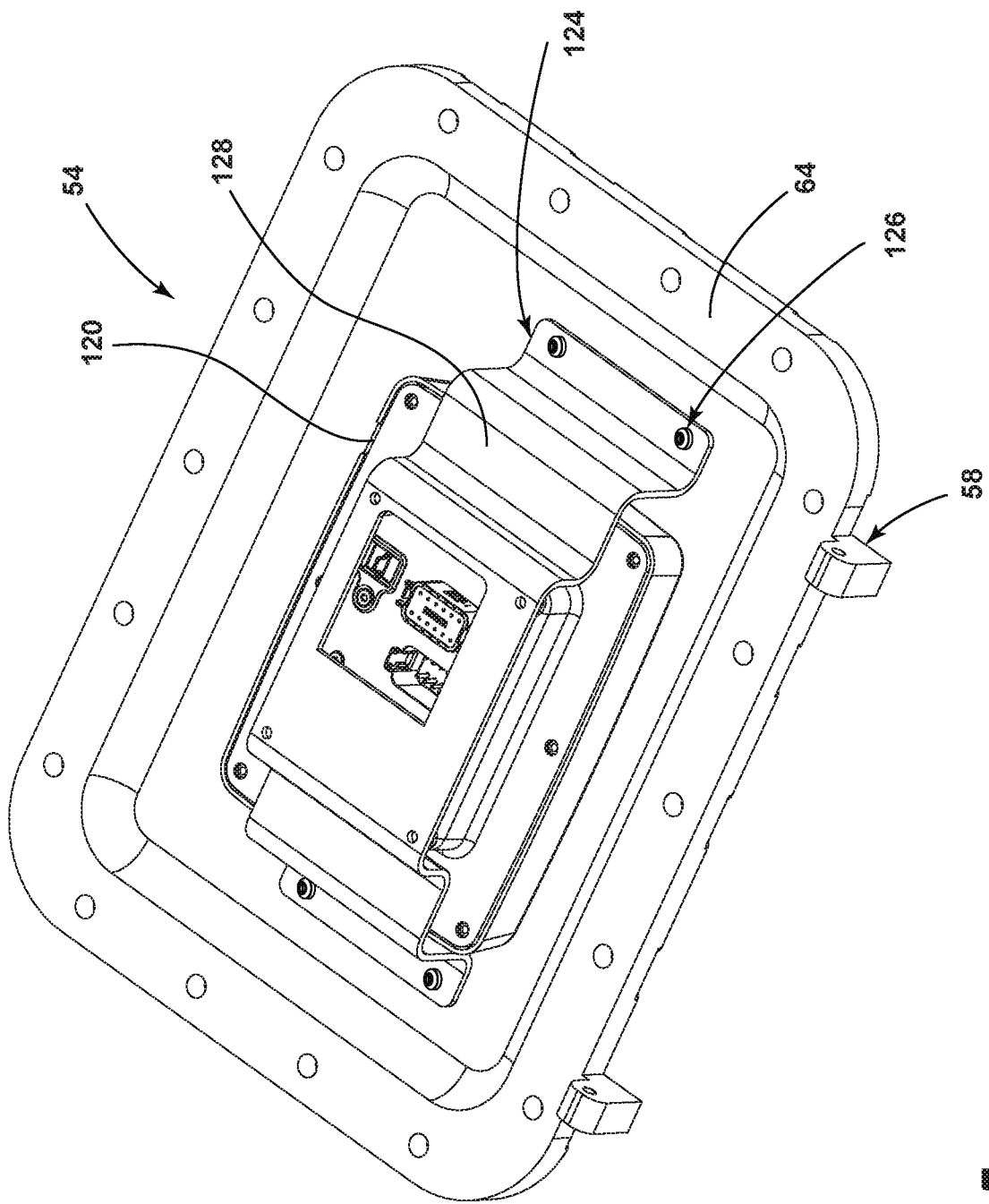
FIG. 5 is a perspective view generally illustrating embodiments of a cover and a display in accordance with teachings of the present disclosure.
Figure 6:
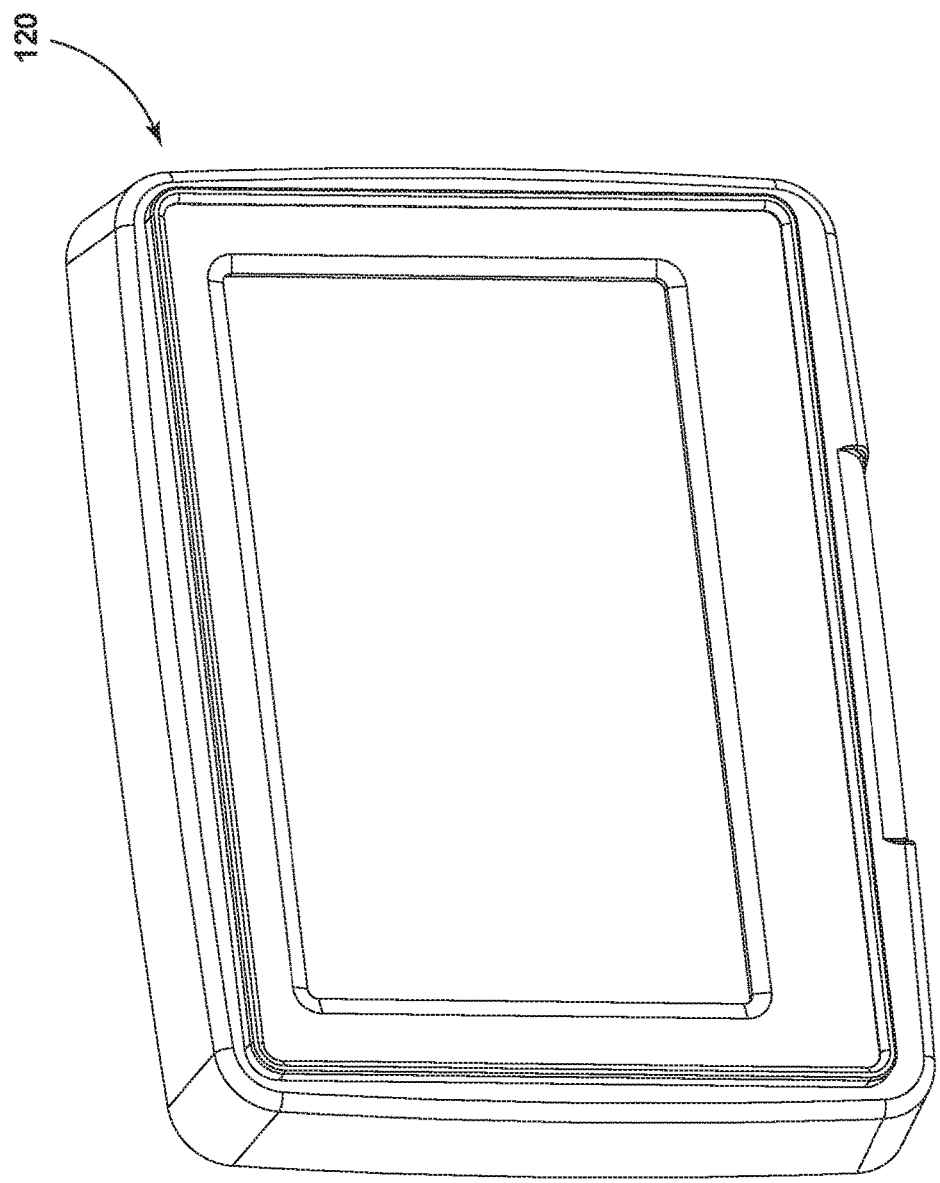
FIG. 6 is a perspective view generally illustrating an embodiment of a display in accordance with teachings of the present disclosure.

With assemblies or systems associated with the present disclosure, temperature sensors (e.g., sensors 182, 184) may be mounted in an area, such as anticipated or major hot spot(s) that may be expected to reach the greatest temperatures—see, e.g., FIGS. 1, 3A and 3B. Sensors 182, 184 and/or a controller (e.g., first controller 92, which may be connected to sensors 182, 184) may intelligently monitor a temperature change (e.g., a rise) inside and/or outside of the enclosure. Such early detection of ambient temperature inside and outside an explosion-proof enclosure 40 can help facilitate a system taking an appropriate action. For example and without limitation, if a change or rate of change of an internal temperature and/or an external temperature are outside of a certain or specified range, a first controller 92 may communicate an alert message to a display 120 through CAN communication (e.g., via first wiring harness 172, terminal block first section 134, and/or fourth wiring harness 178). If an operator is not able to attend to an alert message and the temperature increases beyond a set or maximum limit, then system 180 may be configured for some form or measure of self-determination. For example and without limitation, with the detection of a temperature meeting or exceeding a set or specified (e.g., maximum) value or limit, system 180 (e.g., via first controller 92, second controller 94, and/or third controller 96) may automatically implement an action or order, such as stopping a refueling operation. Such automatic action can improve operation and help make a fluid system 100 intrinsically safer.

With such an element/feature, embodiments of a fluid control system 30, which may be utilized in connection with an aircraft ground refueling system 100, may, for example, provide proactive detection with respect to a fire/explosion. Such a feature may, if desired, activate a fire alarm to avoid further catastrophic instances by stopping refueling, and may isolate fuel flow, which can make a fluid control system 30 (such as a Digital IV system offered by Eaton Corporation) more robust and reliable.

In embodiments, one or more external temperature sensors (e.g., sensor 182) may be mounted in a number of positions or locations. In embodiments, mounting may be along or adjacent an enclosure 50 or may be located at or near probable hazardous locations to monitor a temperature. One or more sensors 182 may also be installed near fluid valves (e.g., fluid control valve 106). Further, temperature sensing techniques may optionally be based on feasibility of an application and/or various specifications, such as operational or safety requirements. Sensing techniques may involve, without limitation, a thermocouple, infrared temperature sensing, thermal imaging, or various other advanced techniques that might be acceptable in connection with a wired or wireless communication system or with a fluid control system 30.

With embodiments, an enclosure assembly 40 may include one or more components that may be configured to reduce the likelihood of and/or prevent sparking and/or overheating. For example and without limitation, an electrical intrinsic barrier 192 may be connected to a DIN rail 132 and/or a base or mounting plate 80 (see, e.g., FIG. 1).

In embodiments, an enclosure assembly 40 may or may not include splice packs. Reducing or eliminating splice packs may reduce cost and/or weight. Ultrasonic welding may be utilized, such as to create extra space within an enclosure assembly 40.

With some designs, controllers and displays may be mounted in two separate enclosures used in an explosive environment. However, embodiments of the present disclosure may provide a unique package design that may include one or more controllers 92, 94, 96 and a display 120 disposed in one explosion-proof enclosure 50. Such a design approach can tend to save overall weight and cost of a display enclosure, as well as an associated wire harness. However, the mounting is not limited to the illustrated example(s), and other innovative ways of mounting can be used.

In embodiments, some or all wiring, such as wiring for connecting controllers 92, 94, 96 with each other and/or with display 120, may be disposed inside an explosion-proof enclosure 50, so enclosure assemblies 40 may be less prone to external electromagnetic noise and/or interference, which may increase the reliability of an enclosure assembly 40.

Embodiments of the disclosure may involve a unique packaging of an explosion-proof enclosure 50 or other type of enclosure that may, among other things, reduce cost and weight.

With embodiments, some or all system components, such as first controller 92, second controller 94, third controller 96, and/or terminal block 130, may be connected or mounted in such a way that some amount (e.g., about 40%) of cross sectional free space may be provided in X, Y, and/or Z directions, for example, to meet requirements (such as ATEX requirements).

In embodiments, an enclosure assembly 40 may include a modular design that may be compatible with one or more systems, such as fueling systems 100 and/or fueling control systems 30 (e.g., a Digital IV system offered by Eaton Corporation). For example and without limitation, modular wire harness designs may be easily utilized in connection with various refueling system configurations.

Relative to other designs, embodiments of enclosure assemblies 40 may be more cost effective, may be lighter, may include temperature diagnostics/monitoring, may be easier to install (e.g., via modularity), may be more compact, may include simplified wiring harness designs that may be less sensitive to external noise, may include a modular design that may be configured in numerous ways for a variety of applications, and/or may be easier to assemble, maintain, and/or service.

In embodiments, a controller (e.g., first controller 92, second controller 94, third controller 96) may include an electronic controller, a computer, and/or include an electronic processor, such as a programmable microprocessor and/or microcontroller. In embodiments, a controller may include, for example, an application specific integrated circuit (ASIC). A controller may include a central processing unit (CPU), a memory, and/or an input/output (I/O) interface. A controller may be configured to perform various functions, including those described in greater detail herein, with appropriate programming instructions and/or code embodied in software, hardware, and/or other medium. In embodiments, a controller may include a plurality of controllers.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

It is intended that all matter contained in the above description or shown in the accompanying drawings shall be interpreted as illustrative only and not limiting. Changes in detail or structure may be made without departing from the present disclosure.

What is claimed is:

1. A temperature monitoring system, comprising:
    an enclosure;
    a controller and an internal display disposed within the enclosure;
    an external temperature sensor configured to detect an outside temperature outside of the enclosure and communicate the outside temperature to the controller; and
    an internal temperature sensor configured to detect an inside temperature inside the enclosure;
    wherein, upon the controller detecting a change in the outside temperature that exceeds a set value or specified range, the controller implements an action or order to stop fueling.

2. The temperature monitoring system of claim 1, wherein the enclosure is explosion-proof.

3. The temperature monitoring system of claim 1, wherein the internal temperature sensor is disposed proximate a location or area of the enclosure expected to have a greatest temperature.

4. The temperature monitoring system of claim 1, wherein the enclosure includes a cover, the cover includes an explosion-proof window, and the internal display is mounted to the cover and aligned with the explosion-proof window.

5. The temperature monitoring system of claim 1, wherein the controller includes a first controller, a second controller, and a third controller.

6. The temperature monitoring system of claim 5, wherein the first controller is mounted to a first wall of the enclosure, the second controller is mounted to a second wall of the enclosure, and the third controller is mounted to a third wall of the enclosure.

7. An explosion-proof enclosure assembly, comprising:
    an enclosure, including:
        a body; and
        a cover;
    a display disposed in the enclosure and connected to the cover;
    a first controller disposed in the enclosure and connected to the display;
    a second controller disposed in the enclosure; and
    an external temperature sensor;
    wherein, upon the-external temperature sensor detecting an outside temperature exceeds a set or specified value or limit, the first controller implements an action or order, and wherein the first controller is a programmable logic controller, and the second controller is a pressure control module.

8. The explosion-proof enclosure assembly of claim 7, including:
    a terminal block disposed in the enclosure;
    a terminator disposed in the enclosure; and
    a first wiring harness connecting the first controller with the terminal block and the terminator;
    a third controller disposed in the enclosure;
    a second wiring harness connecting the second controller with the terminal block and the terminator;
    a third wiring harness connecting the third controller with the terminal block and the terminator; and
    a fourth wiring harness connecting the display to the terminal block and the terminator.

9. The explosion-proof enclosure assembly of claim 8, wherein the body includes a first wall, a second wall, a third wall, a fourth wall, and a fifth wall, and the fifth wall is disposed substantially perpendicularly to the first wall, the second wall, the third wall, and the fourth wall.

10. The explosion-proof enclosure assembly of claim 9, wherein the first controller is mounted to the first wall, the second controller is mounted to the second wall, and the third controller is mounted to the third wall.

11. The explosion-proof enclosure assembly of claim 10, wherein the fourth wall includes a plurality of apertures and a plurality of certified cable glands connected to at least some apertures of the plurality of apertures.

12. The explosion-proof enclosure assembly of claim 8, wherein the first controller includes a programmable logic controller, the second controller includes a first fluid pressure controller, and the third controller includes a second fluid pressure controller.

13. The explosion-proof enclosure assembly of claim 8, including a base plate connected to the body; wherein the terminal block is connected to the base plate via a DIN rail.

14. The explosion-proof enclosure assembly of claim 8, wherein the terminal block includes a first section, a second section, and a third section, and the first section, the second section, and the third section are separate from each other and disposed substantially in parallel with each other.

15. The explosion-proof enclosure assembly of claim 14, wherein the first wiring harness is connected to the first section, the second section, and the third section; the second wiring harness is connected to the first section and the second section; the third wiring harness is connected to the first section and the third section; and the fourth wiring harness is connected to the third section.

16. The explosion-proof enclosure assembly of claim 15, wherein the first section is connected to a fuse to limit an electrical current provided to the first controller, the second controller, the third controller, and the display.

17. The explosion-proof enclosure assembly of claim 7, wherein the display is mounted to an inner surface of the cover via a bracket.

18. The explosion-proof enclosure assembly of claim 17, wherein the cover includes a window that is at least semi-transparent and the display is aligned at least partially with the window.

19. The explosion-proof enclosure assembly of claim 8, wherein the third controller is a pressure control module.

\* \* \* \* \*